US010095766B2

(12) United States Patent
Kapoor et al.

(10) Patent No.: US 10,095,766 B2
(45) Date of Patent: Oct. 9, 2018

(54) AUTOMATED REFINEMENT AND VALIDATION OF DATA WAREHOUSE STAR SCHEMAS

(71) Applicant: Numerify, Inc., Cupertino, CA (US)

(72) Inventors: Rahul Kapoor, Sunnyvale, CA (US); Gaurav Rewari, Cupertino, CA (US); Renu Chintalapati, San Ramon, CA (US); Aravind Sridharan, San Jose, CA (US); Ravishankar Muniasamy, Bangalore (IN); Florian Schouten, Wayland, MA (US); David Shenk, Campbell, CA (US); Srinivas M. Vedagiri, Karnataka (IN)

(73) Assignee: Numerify, Inc., San Jose, CA (US)

( * ) Notice: Subject to any disclaimer, the term of this patent is extended or adjusted under 35 U.S.C. 154(b) by 389 days.

(21) Appl. No.: 14/921,982

(22) Filed: Oct. 23, 2015

(65) Prior Publication Data

US 2017/0116307 A1  Apr. 27, 2017

(51) Int. Cl.
G06F 17/30  (2006.01)
(52) U.S. Cl.
CPC .. *G06F 17/30592* (2013.01); *G06F 17/30297* (2013.01)
(58) Field of Classification Search
None
See application file for complete search history.

(56) References Cited

U.S. PATENT DOCUMENTS

| 9,286,370 | B2* | 3/2016 | Cushing | G06F 17/30592 |
| | | | | 707/999.001 |
| 2007/0165049 | A1* | 7/2007 | Murawski | G06Q 10/00 |
| | | | | 345/619 |
| 2008/0059524 | A1* | 3/2008 | Biedenstein | G06F 17/30292 |
| | | | | 707/999.107 |
| 2008/0183744 | A1* | 7/2008 | Adendorff | G06Q 10/10 |
| | | | | 707/999.102 |
| 2009/0265335 | A1* | 10/2009 | Hoffman | G06F 17/30592 |
| | | | | 707/999.005 |
| 2011/0040727 | A1* | 2/2011 | Golab | G06F 17/30445 |
| | | | | 707/618 |

(Continued)

*Primary Examiner* — Yuk Ting Choi
(74) *Attorney, Agent, or Firm* — Rahman LLC

(57) ABSTRACT

An automated system for validating and refining a template warehouse star schema for a customized data source. The system based on automatically gathered information from the data source such as custom entities and constituent columns, data type and length of custom columns, custom entity keys, relationships of custom entities with other entities, relationships within custom entities, contribution of custom entities to specialized entities, update frequency of custom entities and columns including grouping of updates, frequently used expressions on custom columns and contribution of custom entities and columns to workflow and correlated attributes automatically determines facts, dimensions, dimension hierarchies, measures, workflow specific measures (if data source has workflows) and workflow correlated attribute specific measures (if data source has temporal, priority, ownership and progress tracking workflow correlated attributes) to validate and refine the star schema of the template warehouse to accommodate customizations of the data source.

20 Claims, 12 Drawing Sheets

(56) References Cited

U.S. PATENT DOCUMENTS

2011/0295794 A1* 12/2011 Venkatasubramanian ...................
                                                G06F 17/30563
                                                     707/602
2012/0054249 A1*  3/2012 Batra ................ G06F 17/30592
                                                     707/803
2012/0179644 A1*  7/2012 Miranker .......... G06F 17/30563
                                                     707/605

* cited by examiner

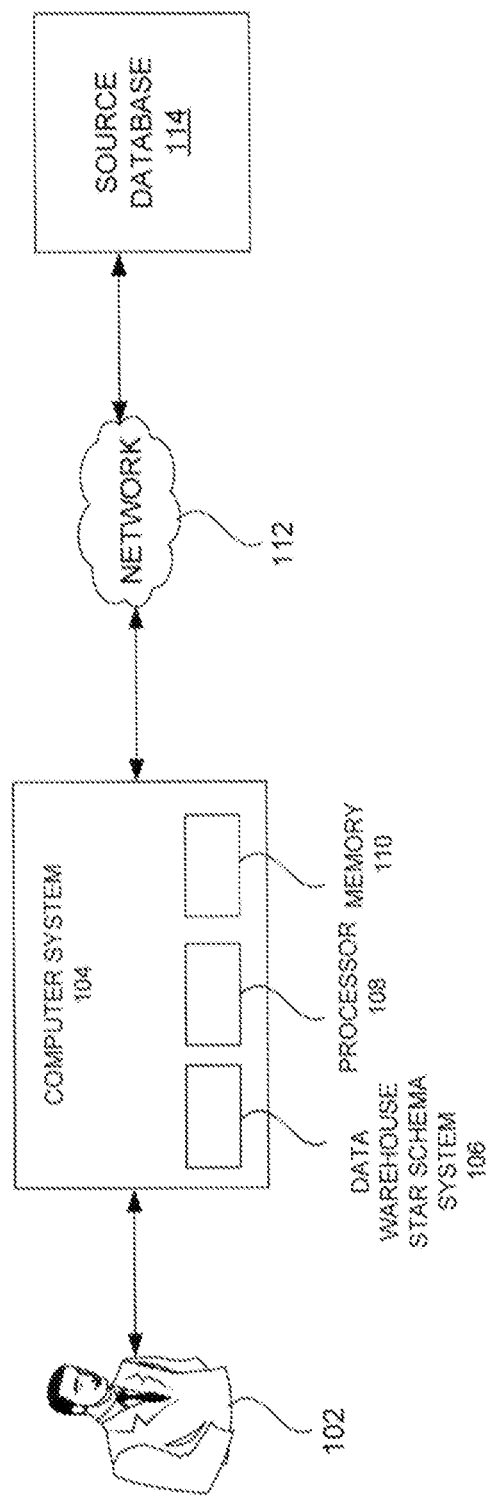

AUTOMATED REFINEMENT AND VALIDATION OF DATA WAREHOUSE STAR SCHEMAS

BACKGROUND

Technical Field

The embodiments herein generally relate to data warehouse, and, more particularly, to an automated system and method for refining or validating a data warehouse schema for a source database.

Description of the Related Art

Data aggregation relates to any process in which information is gathered, arranged, and/or expressed in the form of a summary for purposes such as statistical analysis. In one example relating to data aggregation, the detailed activities of a business may be converted by data aggregation into a high-level view of the business, which can then be used by business managers and non-technical users for evaluation purposes. There are many purposes for data aggregation. One specific purpose of data aggregation is to acquire information about particular groups, based on specific variables, such as age, profession, or income. Creating a data warehouse with historical data stored in a star schema is one method of supporting data aggregation.

Star schema is a database design that may be used for modeling data warehouses to enable analytical querying of numeric data. The star schema may relate to dimensional data, which describes how data is commonly aggregated, and/or fact or event data, which describes individual transactions. Accordingly, the star schema may include two types of database tables (e.g., facts tables and dimension tables). Facts tables contain aggregated numeric and additive values, generally referred to as measurements. Dimension tables contain values for different perspectives by which the measurements can be interpreted.

In one example relating to the star schema, a facts table may contain columns that store aggregated sales amounts of a company. Additionally, associated dimension tables may contain columns that may be used to query the sales amounts by time, location, and customer. In accordance with this example, a star schema may include one facts table (i.e., aggregated sales amounts) and three dimension tables (i.e., time, location, and customer). Each dimension table may contain detailed information about one dimension (e.g., city, state, and country name fields in the location table). Additionally, the facts table presented in this example may contain three foreign key columns (one for each dimension table's primary key), and one or more columns for storing numeric measurements (e.g., the sales amount). A primary key may be an attribute or group of attributes that uniquely identifies a tuple (i.e., a set of attribute values pertaining to a given item in a database) within a database or table. For example, a client table might have a client number as its primary key. A foreign key, on the other hand, may be a table field that is not a key in its current table, but is a primary key in another database table.

The design of a star schema may require knowledge of data relationships and underlying semantics, which may be obtained by analysis of the data. Accordingly, star schema design is typically resource intensive. Some tasks related to determining a star schema may utilize manual analysis or human input to explain data semantics and relationships. It may be difficult to determine which data fields can be placed into the facts or dimension tables and to determine whether there exist any hierarchical or functional relationships among the fields that are chosen for dimension tables. Additionally, even aspects that do not utilize human input may require specific tools and applications that assume the existence of semantic and relational knowledge about the data. Traditionally, as part of developing a warehouse, ETL consultants define the dimensional model by figuring out the facts and dimensions, suggesting measures and hierarchies and mapping the facts and dimensions to the source schemas. This can be an expensive process both in terms of the cost of ETL consultants and the development time required, and are expensive to maintain as well given that source schemas evolve over time.

Accordingly, there remains a need for a faster and less expensive system to provide suggestions for refining or validating an existing template warehouse to handle customer specific customizations at the source database.

SUMMARY

In view of the foregoing, an embodiment herein provides a processor implemented automated data warehouse star schema system for automatically refining a template warehouse star schema. The automated data warehouse schema system includes an input gathering module, a fact determining module, a dimension determining module, and an automated star schema refinement module. The input gathering module, implemented by the processor, automatically compares a customized source database with baseline template warehouse to gather a custom information associated with the source database. The custom information may include i) a data type or a length of custom columns, ii) frequently used expressions on custom columns, iii) custom entities or information on constituent columns of the custom entities, iv) custom entity keys, v) relationships of custom entities with other entities, vi) relationships within custom entities, vii) a contribution of custom entities to specialized entities, viii) an update frequency of custom entities and columns, ix) a grouping of custom entity and column updates, or x) a contribution of custom entities and columns to workflows and correlated attributes. The fact determining module, implemented by the processor, automatically determines facts by determining frequently updated numeric non key custom columns and the custom entities. The dimension determining module, implemented by the processor, automatically determines dimensions by determining non-numeric custom columns and the custom entities that are infrequently updated and that are linked to the facts by foreign keys. The automated star schema refinement module, implemented by the processor, automatically suggests at least one of (i) subsumption of a custom entity into an entity of the template warehouse star schema based on a type of mapped target of related entities, a column type of the custom entity or an update frequency of the custom entity if the custom entity is related to the entity of the template warehouse star schema, (ii) creation of new facts or dimensions for the custom entity based on a column type of the custom entity or an update frequency of the custom entity if the custom entity is a standalone entity, or (iii) creation of specialized entities or augmentation of specialized entities in the template warehouse star schema if the custom entity is related to a currency or a unit of measure to refine a template warehouse star schema for the source database.

In one embodiment, the automated star schema refinement module automatically determines dimension hierarchies based on hierarchical relationships within custom entities determined to be dimensions. In another embodiment, the automated star schema refinement module automatically refines measures in the template warehouse with frequently used expressions on new custom columns. In yet another embodiment, the automated data warehouse star schema system includes a measure determining module, implemented by the processor, that (a) automatically incorporates new workflow specific measures into the template warehouse if the custom entities or the custom columns contribute to workflows or workflow correlated attributes, or (b) automatically suggests workflow specific measures and workflow correlated attributes specific measures. The workflow specific measures and workflow correlated attributes specific measures may include any of (i) temporal measures based on custom temporal attributes and the workflow stage, (ii) progress tracking measures based on custom progress tracking attributes and the workflow stage, (iii) priority related measures based on custom priority related attributes and the workflow stage, or (iv) ownership related measures based on custom ownership related attributes and the workflow stage.

The temporal measures may include any of (a) a duration in each workflow stage, (b) minimum, maximum, or average times for each workflow stage, (c) a minimum, maximum, or average time for workflow completion, (d) active or closed items over time, or (e) a number of times a total time exceeds a promised time. The progress tracking measures may include any of (a) updates per workflow stage, or (b) updates per workflow stage over time. The ownership related measures may include any of (a) measures related to tracking productivity selected from (i) resolved by an owner, or (ii) resolved by the owner over time, or (b) measures that indicates problems selected from (i) reassignment frequency, or (ii) a reassignment frequency over time. The priority related measures may include any of (a) count or percentage of items in each priority class, or (b) count or percentage of items in each priority class by workflow stage.

In yet another embodiment, the custom information is gathered by querying programmatic APIs associated with a customized source database to determine source customizations with reference to a baseline template warehouse. The source customizations may include any of (a) custom entities, or (b) custom columns. The custom entities may include any of (i) new entities that are added to the template warehouse star schema, or (ii) modified entities of the template warehouse star schema. The custom columns may include any of (i) new columns that are added to the entities of the template warehouse star schema, or (ii) modified columns of the template warehouse star schema. In yet another embodiment, the custom information is gathered by automatically analyzing queries on the custom source database to determine any of (i) custom entities and custom columns, (ii) custom entity keys, (iii) relationships between and within custom entities, (iv) potential measures for the custom columns, (v) workflow attributes based on the custom columns, or (vi) an update frequency associated with the custom entities and the custom columns of the custom source database. In yet another embodiment, the custom information is gathered based on automatically analyzing the source data to determine any of (i) custom entities and custom columns, (ii) if the custom columns are entity keys (iii) if the custom columns contribute to relationships between and within entities, (iv) if the custom columns contribute to workflows, or (v) if the custom columns or custom entities contribute to specialized entities.

In one aspect, one or more non-transitory computer readable storage mediums storing one or more sequences of instructions, which when executed by one or more processors, to perform a method of automatically refining a template warehouse star schema is provided. The method includes the steps of: (a) automatically comparing a customized source database with baseline template warehouse to gather a custom information such as i) a data type or a length of custom columns, ii) frequently used expressions on custom columns, iii) custom entities or information on constituent columns of the custom entities, iv) custom entity keys, v) relationships of custom entities with other entities, vi) relationships within custom entities, vii) a contribution of custom entities to specialized entities, viii) an update frequency of custom entities and columns, ix) a grouping of custom entity and column updates, or x) a contribution of custom entities and columns to workflows and correlated attributes; (b) automatically determining facts by determining frequently updated numeric non key custom columns and the custom entities; (c) automatically determining dimensions by determining non-numeric custom columns and the custom entities that are infrequently updated and that are linked to the facts by foreign keys; (d) automatically determining dimension hierarchies based on hierarchical relationships within custom entities determined to be dimensions; and (e) automatically suggesting at least one of (i) subsumption of a custom entity into an entity of the template warehouse star schema based on a type of mapped target of related entities, a column type of the custom entity or an update frequency of the custom entity if the custom entity is related to the entity of the template warehouse star schema, (ii) creation of new facts or dimensions for the custom entity based on a column type of the custom entity or an update frequency of the custom entity if the custom entity is a standalone entity, or (iii) creation of specialized entities or augmentation of specialized entities in the template warehouse star schema if the custom entity is related to a currency or a unit of measure to refine a template warehouse star schema for the source database.

In one embodiment, the method includes the step of automatically refining measures in the template warehouse with frequently used expressions on new custom columns. In another embodiment, the method further includes the steps of: (a) automatically incorporating new workflow specific measures into the template warehouse if the custom entities or the custom columns contribute to workflows or workflow correlated attributes, or (b) automatically suggesting workflow specific measures and workflow correlated attributes specific measures. The workflow specific measures and workflow correlated attributes specific measures may include any of (i) temporal measures based on custom temporal attributes and the workflow stage, (ii) progress tracking measures based on custom progress tracking attributes and the workflow stage, (iii) priority related measures based on custom priority related attributes and the workflow stage, or (iv) ownership related measures based on custom ownership related attributes and the workflow stage. The temporal measures may include any of (a) a duration in each workflow stage, (b) minimum, maximum, or average times for each workflow stage, (c) a minimum, maximum, or average time for workflow completion, (d) active or closed items over time, or (e) a number of times a total time exceeds a promised time. The progress tracking measures may include any of (a) updates per workflow stage, or (b) updates per workflow stage over time. The ownership related measures may include any of (a) measures related to tracking productivity selected from (i) resolved by an owner, or (ii) resolved by the owner over time, or (b) measures that indicates problems selected from (i) reassignment frequency, or (ii) a reassignment frequency over time. The priority related measures may include any of (a) count or percentage of items in each priority class, or (b) count or percentage of items in each priority class by workflow stage.

In yet another embodiment, the method further includes the step of automatically determining a relevance of custom entities by analyzing an underlying model and queries on the custom entities in operational reports to determine any of (i) relevant custom entities, (ii) relevant custom columns, (iii) relationships between and within the custom entities, or (iv) measures on the custom columns.

In yet another embodiment, the custom information is gathered by querying programmatic APIs associated with a customized source database to determine source customizations with reference to a baseline template warehouse. The source customizations may include any of (a) custom entities, or (b) custom columns. The custom entities may include any of (i) new entities that are added to the template warehouse star schema, or (ii) modified entities of the template warehouse star schema. The custom columns may include any of (i) new columns that are added to the entities of the template warehouse star schema, or (ii) modified columns of the template warehouse star schema. In yet another embodiment, the custom information is gathered by automatically analyzing queries on the custom source database to determine any of (i) custom entities and custom columns, (ii) custom entity keys, (iii) relationships between and within custom entities, (iv) potential measures for the custom columns, (v) workflow attributes based on the custom columns, or (vi) an update frequency associated with the custom entities and the custom columns of the custom source database. In yet another embodiment, the custom information is gathered based on automatically analyzing the source data to determine any of (i) custom entities and custom columns, (ii) if the custom columns are entity keys (iii) if the custom columns contribute to relationships between and within entities, (iv) if the custom columns contribute to workflows, or (v) if the custom columns or custom entities contribute to specialized entities.

In one aspect, one or more non-transitory computer readable storage mediums storing one or more sequences of instructions, which when executed by one or more processors, to perform a method of automatically validating a data warehouse is provided. The method includes the step of automatically validating at least one of i) a data type or a length of existing columns, ii) existing entities, iii) existing entity keys, iv) relationships of existing entities with other entities, v) relationships within existing entities, vi) a contribution of existing entities to specialized entities, or vii) a contribution of existing entities and columns to workflow and correlated attributes in the data warehouse based on at least one of (a) a usage analysis technique by automatically querying on a source database to determine if existing warehouse entities, columns and workflow attributes are being used and if assumed relationships are being exercised, (b) a data profiling technique by automatically analyzing data in the source database to determine changes due to customer specific customizations, source schema updates, or data quality issues, (c) an operational reporting environment analysis technique by automatically analyzing an underlying model and queries in operational reports to identify which of the existing entities, relationships, and measures are relevant and if specialized entities or standard units assumed are valid; or (d) a source metadata analysis technique by automatically analyzing programmatic metadata APIs or documentation to identify changes due to customer specific customizations or source schema updates.

The method further includes the steps of: (a) automatically validating facts by determining frequently updated numeric non key custom columns and the custom entities, (b) automatically validating dimensions by determining non-numeric custom columns and the custom entities that are infrequently updated and that are linked to the facts by foreign keys, and (c) automatically validating dimension hierarchies based on hierarchical relationships within custom entities determined to be dimensions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a system view illustrating a user interacting with a data warehouse star schema system using a computer system for defining, or refining a data warehouse schema for a source database according to an embodiment herein;

DETAILED DESCRIPTION OF PREFERRED EMBODIMENTS

Figure 2A:
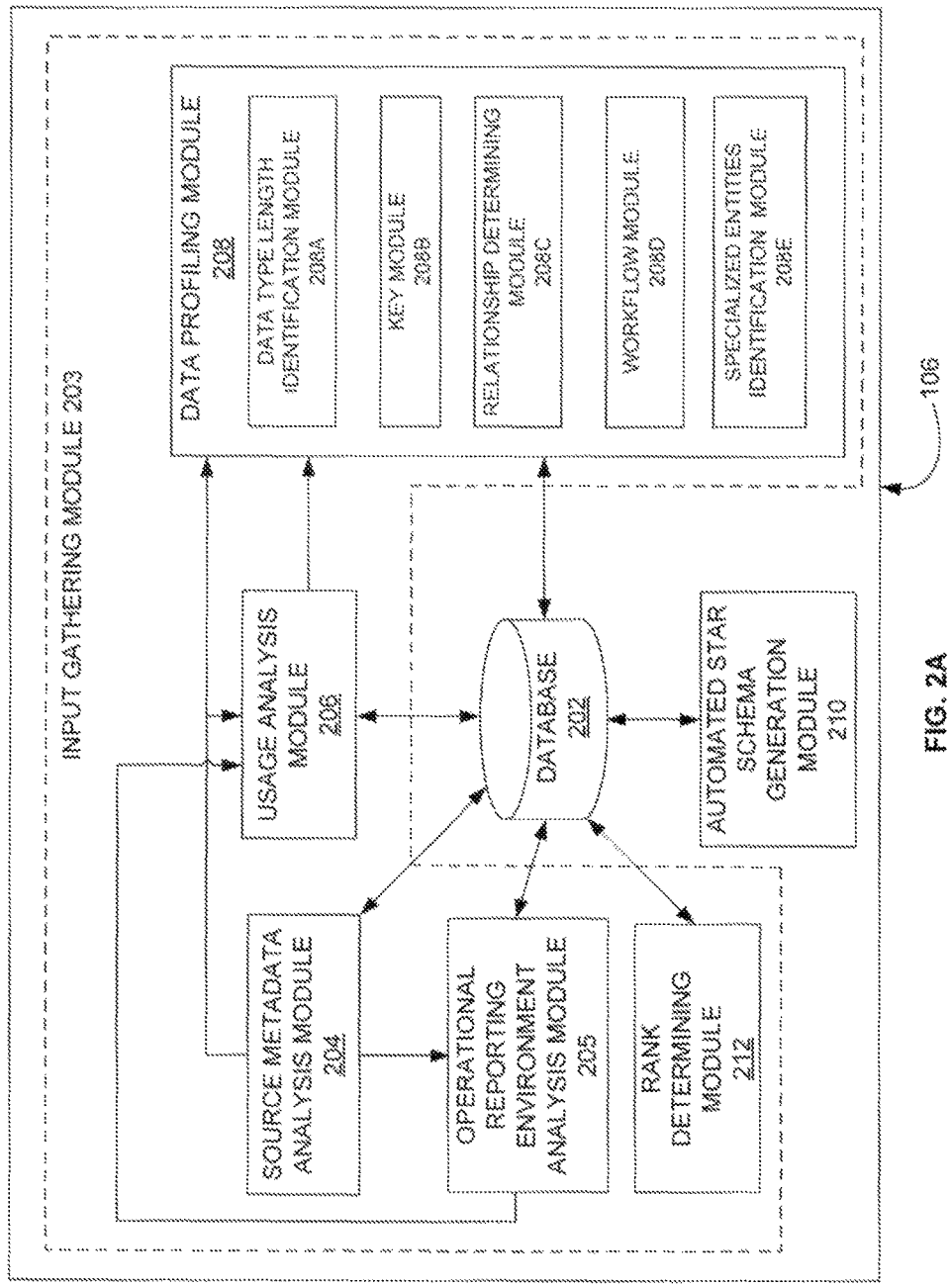
FIG. 2A illustrates an exploded view of the data warehouse star schema system of FIG. 1 according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide a system for automatically gathering inputs for defining, refining, or validating star schema for a source database. The system may determine a data warehouse schema based on analysis of a source database, or refine an existing template data warehouse schema to handle customer specific customizations at the source database. Referring now to the drawings, and more particularly to FIGS. 1 through 7, where similar reference characters denote corresponding features consistently throughout the figures, preferred embodiments are shown.

FIG. 1 is a system view illustrating a user 102 interacting with a data warehouse star schema system 106 using a computer system 104 for defining a data warehouse schema for a source database 114 according to an embodiment herein. The computer system 104 further includes a memory 110 that stores instructions and a processor 108 configured by the instructions to execute the data warehouse star schema system 106. The data warehouse star schema system 106 defines a data warehouse schema based on analysis of the source database 114. In one embodiment, the data warehouse star schema system 106 refines an existing template (e.g., XML with an XSD describing the XML) data warehouse schema to provide customer specific customizations at the source database 114.

The data warehouse star schema system 106 may analyze queries on the source database 114 to identify one or more of (i) entities and columns, (ii) entity keys, (iii) relationships between and within entities, (iv) measures, (v) workflow attributes, (vi) an update frequency associated with the entities and the columns of the source database 114, and (vii) grouping of updates of entities and columns for defining, refining or validating the star schema.

The data warehouse star schema system 106 may further automatically analyze data in the source database 114 to identify one or more of (i) entity keys, (ii) relationships between and within entities, (iii) measures, (iv) workflow attributes, and (v) specialized entities for defining, refining or validating the star schema. In one embodiment, the data warehouse star schema system 106 analyzes an underlying model and queries in the operational reports to determine one or more of (i) candidate significant entities out of the entities of the source database 114, (ii) relationships between and within the entities, (iii) specialized entities, and (iv) relevant measures.

In another embodiment, the data warehouse star schema system 106 automatically generates a template for repeatedly extracting the metadata by searching name patterns, and/or keywords that indicate a key column, a relationship, a workflow, or a specialized entity. In one embodiment, the metadata is identified and/or retrieved from the source database 114 using XPath or XQuery. In another embodiment, the metadata is parsed and indexed using standard NLP (Natural Language Processing), and/or IR (Information out Retrieval) techniques that allow efficient querying of the metadata using searches when the metadata is not identified, and/or retrieved.

The data warehouse star schema system 106 may identify main entities, keys for the entities, relationships between and within entities, update frequency of entities, grouping of updates of entities, and/or workflows of the source database 114 for defining a data warehouse schema. The data warehouse star schema system 106 may further identify dedicated entities dealing with aspects like unit of measure conversion and currency conversion of the source database 114 for defining a data warehouse schema.

The data warehouse star schema system 106 may further (i) automatically determine facts by analyzing frequently updated numeric columns from the columns, and/or (ii) automatically determine dimensions by analyzing non-numeric columns from the columns that are infrequently updated and that are linked to the facts by foreign keys. The data warehouse star schema system 106 automatically groups the facts and the dimensions within (i) a source entity, and/or (ii) a set of related entities of the entities to determine a star schema for the source database 114. In one embodiment, the data warehouse star schema system 106 may compare a customized source database (e.g., the source database 114) with baseline template warehouse to gather custom information. The data warehouse star schema system 106 may further (i) automatically determine facts by determining frequently updated numeric non key custom columns and the custom entities, and/or (ii) automatically determine dimensions by determining non-numeric custom columns and the custom entities that are infrequently updated and that are linked to the facts by foreign keys for refining a template warehouse star schema. In another embodiment, the data warehouse star schema system 106 may (i) automatically validate facts by determining frequently updated numeric non key custom columns and the custom entities, and (ii) automatically validate dimensions by determining non-numeric custom columns and the custom entities that are infrequently updated and that are linked to the facts by foreign keys for validating a data warehouse.

FIG. 2A illustrates an exploded view of the data warehouse star schema system 106 of FIG. 1 according to an embodiment herein. The data warehouse star schema system 106 includes a database 202, an input gathering module 203, an automated star schema generation module 210, and a rank determining module 212. The database 202 may store metadata that includes a pre defined source application protocol interface (API) corresponding to the source database 114. The input gathering module 203 is configured to automatically identify one or more of (i) entities and columns, (ii) column types and lengths, (iii) entity keys, (iv) relationships between and within the entities, (v) relationship within the entities, (vi) measures, (vii) workflow attributes, (viii) specialized entities, (ix) an update frequency of the entities and the columns associated with the source database 114, and (x) grouping of updates of entities and columns. The input gathering module 203 may include a source metadata analysis module 204, an operational reporting environment analysis module 205, a usage analysis module 206, and a data profiling module 208.

The source metadata analysis module 204 may be configured to automatically analyze programmatic APIs or documentation associated with the source database 114 to extract metadata for defining, refining or validating the star schema based on name patterns, and/or keywords. The source metadata analysis module 204 may be configured to automatically analyze the source database 114 to extract metadata based name patterns, and/or keywords. The metadata may include one or more of (i) entities and columns, (ii) column types and lengths, (iii) entity keys, (iv) relationships between and within the entities, (v) workflow attributes, and (vi) specialized entities corresponding to the source database 114. In one embodiment, the name patterns may be Id, or Key, or PrimaryKey, or ForeignKey, or PKey, or FKey, or PK, or FK. The source metadata analysis module 204 may extract the metadata from an API or documentation associated with the source database 114 based on a source metadata analysis technique by searching for a name pattern or a keyword that indicates an entity, a column, a key column, a relationship, a workflow, or a specialized entity. In one embodiment, the source metadata analysis module 204 automatically generates a template for repeatedly extracting the metadata based on the name patterns and/or keywords that indicate a key column, a relationship, a workflow or a specialized entity. The API may provide a list of entities to search the metadata by locating entities or by using the list of entities as a starting point for searches.

In one embodiment, the source metadata analysis module 204 creates a template for documentation by recording search keywords along with the process of extracting relevant metadata from the results. The search and metadata extraction process is easily replayed when the documentation is updated for a new release at the source database 114.

The operational reporting environment analysis module 205 determines one or more of (i) candidate significant entities out of the entities of the source database 114, (ii) relationships between and within the entities, (iii) specialized entities, and (iv) relevant measures by automatically analyzing the underlying model and queries in the operational reports. In one embodiment, the operational reporting environment analysis module 205 receives metadata information from the source metadata analysis module 204. The metadata information may include (i) entities and columns, (ii) specialized entities, (iii) relationships between and within the entities of the source database 114 that are indentified by the source metadata analysis module 204. In one embodiment, the operational reporting environment analysis module 205 is configured to analyze an underlying model and queries in the operational reports based on operational reporting environment analysis technique to determine one or more of (i) candidate significant entities out of the entities of the source database 114, (ii) relationships between and within the entities, (iii) specialized entities, and (iv) relevant measures.

The usage analysis module 206 is configured to automatically analyze queries on the source database 114 based on a usage analysis technique to identify one or more of (i) entities and columns, (ii) entity keys, (iii) relationships between and within entities, (iv) measures, (v) workflow attributes, (vi) an update frequency associated with the entities and the columns of the source database 114, and (vii) grouping of updates of entities and columns for defining, refining or validating the star schema. In one embodiment, the usage analysis module 206 determines entity keys, relationships between and within entities, commonly used measures, and workflows by analyzing the query patterns when the query patterns on the source database 114 are available through logs.

In one embodiment, the usage analysis module 206 receives metadata information from the source metadata analysis module 204. The metadata information may include (i) entities and columns, (ii) column types and lengths, (iii) entity keys, (iv) relationships between and within the entities, and (v) workflow attributes, of the source database 114 that are indentified by the source metadata analysis module 204. In another embodiment, the usage analysis module 206 receives operational reporting information from the operational reporting environment analysis module 205. The operational reporting information may include (i) candidate significant entities out of the entities of the source database 114, (ii) relationships between and within the entities, (iii) specialized entities, and (iv) relevant measures of the source database 114 that are indentified by the operational reporting environment analysis module 205.

In yet another embodiment, the usage analysis module 206 determines the entity keys by analyzing queries on the source database 114 for (i) join conditions of the columns with equality, and (ii) a repetition of equality join conditions of the columns. The usage analysis module 206 may further rank the entity keys associated with a repetition of equality join conditions across the queries higher in a ranked list of candidate entity keys. The usage analysis module 206 further determines a candidate key column based on a join condition with equality in a query on the source database 114. The usage analysis module 206 may rank columns associated with a repetition of equality join conditions across queries higher in a ranked list of candidate key columns The usage analysis module 206 may be configured to (i) determine numeric non key columns that are frequently updated to indicate candidate facts, and (ii) determine non-numeric columns that are infrequently updated and that are linked to the facts by foreign keys to indicate candidate dimensions. The usage analysis module 206 may identify the update frequency for different entities that are used to separate dimensions, which are infrequently updated (e.g., once in several weeks or months) from facts, which are frequently updated (e.g., daily or even more frequently). The usage analysis module 206 may determine an update frequency that is associated with each entity and column by counting inserts, updates and deletes on the entity as well as tracking which columns get updated.

In one embodiment, the usage analysis module 206 determines entities by automatically querying tables in a 'from' clause on the source database 114. The usage analysis module 206 may rank tables which occur across many distinct queries as well as in more frequent queries higher to generate an ordered list of entities. The usage analysis module 206 may be configured to determine commonly used measures by analyzing queries on the source database 114 for expressions on numeric attributes in a projection list. The usage analysis module 206 may rank expressions that occur across distinct queries and in more frequent queries higher in an ordered list of candidate measures.

The usage analysis module 206 may determine the relationships between and within the entities by analyzing queries on the source database 114 for columns that are joined together with a repetition of joins. The usage analysis module 206 further determines implicit relationships by automatically analyzing tables joined together to indicate relationships or hierarchies between tables in queries on the source database 114. In one embodiment, the usage analysis module 206 generates a ranked list of candidate relationships. The candidate relationships that are identified based on tables being joined together with the repetition of joins across queries are ranked higher in the ranked list of candidate relationships. The usage analysis module 206 may further determine hierarchical relationships based on self-referential joins.

The usage analysis module 206 further determines the workflow attributes by analyzing queries on the source database 114 that includes conditions comparing a column to a set of predetermined enumerated values associated with a workflow. The usage analysis module 206 may further determine workflow correlated attributes from the group by column list by analyzing queries with where conditions on workflow columns with group by column list of workflow correlated attributes. The usage analysis module 206 may identify workflow-correlated attributes such as (i) ownership attributes, and (ii) priority attributes using queries with group by columns.

In one embodiment, the usage analysis module 206 generates a list of ranked workflow candidate attributes. In another embodiment, when the predetermined enumerated values in where conditions on a column change across queries, attributes associated with the column are ranked higher in the list of ranked workflow candidate attributes. The usage analysis module 206 may further determine a candidate workflow attribute based on a where condition comparing a column to a set of predetermined domain specific enumerated values (e.g., such as Open(ed), New, InProgress, Resolved, Closed, Cancelled, ReOpened) that are associated with a workflow. In one embodiment, the usage analysis module 206 maintains a workflow attributes catalog by domain and uses the appropriate set for a domain associated with the source database 114.

The data profiling module 208 is configured to automatically analyze data in the source database 114 based on a data profiling technique to identify one or more of (i) entity keys, (ii) relationships between and within entities, (iii) measures, (iv) workflow attributes, (v) key column, and (vi) specialized entities for defining, refining or validating the star schema. The data profiling module 208 may automatically analyze the source database 114 to provide suggestions in determining one or more of (i) entity keys, (ii) relationships between and within entities, (iii) measures, (iv) workflow attributes, and (v) specialized entities. In one embodiment, the data profiling module 208 receives metadata information from the source metadata analysis module 204. The metadata information may include (i) entities and columns, (ii) column types and lengths, (iii) entity keys, (iv) relationships between and within the entities, (v) workflow attributes, and (vi) specialized entities of the source database 114 that are indentified by the source metadata analysis module 204. In another embodiment, the data profiling module 208 receives usage analysis information from the usage analysis module 206. The usage analysis information may include (i) entities and columns, (ii) entity keys, (iii) relationships between and within entities, (iv) relevant measures, (v) workflow attributes, and (vi) an update frequency associated with the entities and the columns of the source database 114 that are indentified by the usage analysis module 206.

The data profiling module 208 may automatically identify columns having predetermined domain specific enumerated values associated with a workflow in the source database 114. The data profiling module 208 determines ID columns with values in a small range typically associated with workflow state transitions to determine workflow attributes.

The data profiling module 208 may further determine workflow correlated attributes selected from one or more of (i) temporal attributes, (ii) priority attributes, (iii) progress tracking attributes, and (iv) ownership attributes. The data profiling module 208 may identify workflow correlated attributes that are specific to a workflow stage. The data profiling module 208 may be configured to determine implicit relationships between and within the entities by comparing data values in similar typed columns across tables while profiling source data, starting with key columns, followed by columns with the same name, followed by columns with the same prefix but key name suffixes, followed by columns with key name suffixes, followed by columns with similar names.

In one embodiment, the data profiling module 208 determines entities by automatically analyzing the tables and columns in the source database 114. The data profiling module 208 includes a data type length identification module 208A, a key module 208B, a relationship determining module 208C, a workflow module 208D, and a specialized entities identification module 208E. The data type length identification module 208A is configured to determine data type lengths of the columns by computing (i) sizes of data type elements, and/or (ii) minimum, maximum, or average sizes of the data type elements. In one embodiment, the data type length identification module 208A determines data type lengths of variable length columns in a straightforward fashion by computing sizes of data type elements and computing the min, max and average sizes. The key module 208B is configured to identify or validate the entity keys by analyzing (i) the source database 114, (ii) columns with name patterns that are associated with a primary key or a foreign key, and/or (iii) columns used for keys like integers or globally unique identifiers (GUID's). In one embodiment, the entity keys associated with a repetition of equality join conditions across the queries may rank higher in a ranked list of candidate entity keys. The relationship determining module 208C is configured to determine implicit relationships between and within the entities by comparing data values in similar typed columns across tables while profiling source data, starting with key columns, followed by columns with the same name, followed by columns with the same prefix but key name suffixes, followed by columns with key name suffixes, followed by columns with similar names.

The workflow module 208D is configured to identify or validate a workflow by identifying columns having predetermined domain specific enumerated values associated with a workflow in the source database 114 or in queries on the source database 114, or by identifying ID columns with values in a small range typically associated with workflow state transitions, or by checking if an item exists in different stages (e.g., order placed, processing initiated, order shipped, payment collected, order returned, payment refunded) with contiguous time intervals. The workflow module 208D determines temporal attributes associated with the workflow based on presence of (i) a start time, (ii) an end time, and/or (iii) a duration in time columns. In one embodiment, the workflow module 208D searches for columns with typical workflow enumerated values (specific for the domain of the data source), as well as for ID columns with values in a small range typically associated with workflow state transitions when candidates are not generated in the source database 114. The workflow module 208D additionally searches for correlated columns which are temporal, or the correlated columns that may track progress, or ownership or priority for workflow items while analyzing data for workflow. In one embodiment, the workflow module 208D may be configured to (i) determine workflow correlated attributes selected from (a) temporal attributes, (b) priority attributes, (c) progress tracking attributes, and/or (d) ownership attributes correlated with the workflow attributes, and (ii) identify workflow correlated attributes that are specific to a workflow stage. If the correlated attribute is a string column sized for capturing names (of individuals or groups), or an ID which is a foreign key to such a record for capturing names, the correlated attributes is categorized as an ownership attribute. In one embodiment, the standard entity identification techniques are run on the data values in the correlated attributes to further validate if the correlated attribute includes names. The workflow module 208D may recognize hierarchies that exist in ownership (e.g., users-→departments). If the correlated attribute is an attribute with enumerated values (e.g., 0, 1, 2, 3 or critical, high, medium, low), the correlated attribute is classified as a priority attribute. If the correlated attribute is other than a string column, and an attribute with enumerated values, the correlated attributes is categorized as a progress tracking attribute. In one embodiment, the temporal attributes are determined based on a presence of (i) a start time, (ii) an end time, and/or (iii) a duration, in time columns. In another embodiment, the progress tracking attributes, priority attributes and the ownership attributes are determined by analyzing a type of attribute that is updated. In yet another embodiment, the ownership tracking attributes are determined based on names of individuals or groups, and/or a foreign key. In yet another embodiment, the priority attributes are determined based on priority related enumerated values associated with a workflow. The workflow module 208D further determines workflow attributes by one or more of (i) automatically analyzing queries on the source database 114 that include conditions comparing a column to a set of predetermined enumerated values associated with a workflow, (ii) automatically determining columns having predetermined domain specific enumerated values associated with a workflow in the source database 114, and (iii) automatically determining ID columns with values in a small range typically associated with workflow state transitions.

The specialized entities identification module 208E is configured to identify unit of measure from the source database 114 based on name matching, and/or facts and measures that are constant multiplicative factors of each other indicating different unit of measures. The specialized entities identification module 208E may identify currency attributes from the source database 114 based on name matching, and/or facts with multiplicative factors that vary slightly by day that are specified in dedicated tables indicating different currencies. In one embodiment, the unit of measure is Kilogram, Kg, Pound, Lb etc. The source database 114 may include a catalog of domain specific unit of measure values similar to the catalog of domain specific workflow enumerated values. The specialized entities identification module 208E may further identify facts and measures that are constant multiplicative factors of each other suggesting which are recorded in different units of measures. The specialized entities identification module 208E may search for entities or columns with money, currency, FX, foreign exchange and common currency names (e.g., dollar, pound etc).

The automated star schema generation module 210 is configured to automatically group the facts and the dimensions within (i) a source entity, or (ii) a set of related entities of the entities to determine a star schema for the source database 114. The automated star schema generation module 210 is further configured to (a) suggest facts by analyzing frequently updated numeric columns from the columns, (b) suggest dimensions by analyzing non-numeric columns from the columns that are infrequently updated and that are linked to the facts by foreign keys, and (c) grouping the facts and the dimensions within (i) a source entity, or (ii) a set of related entities of the entities to create a star schema for the source database 114. In one embodiment, the automated star schema generation module 210 is configured to assemble the warehouse star schema by grouping identified facts into a fact table and linking the identified facts to identified dimensions. In another embodiment, the automated star schema generation module 210 creates new dimension tables for specialized entities corresponding to a recording plus standard unit and a recording plus standard currency. A fact table may reference the recording plus standard unit as well as the recording plus standard currency. The automated star schema generation module 210 may be configured to (i) group dimension attributes that are identified within source entity or within a set of related entities, and (ii) create dimension hierarchies using identified hierarchical relationships within entities.

The rank determining module 212 is configured to gather ranking's of one or more of (i) columns, (ii) entities, (iii) candidate measures, (iv) candidate relationships, (v) workflow candidate attributes, (vi) candidate entity keys from the usage analysis module 206, and/or the data profiling module 208 to determine a cumulative ranking for each of (i) columns, (ii) entities, (iii) candidate measures, (iv) candidate relationships, (v) workflow candidate attributes, (vi) candidate entity keys of the source database 114.

Figure 2B:
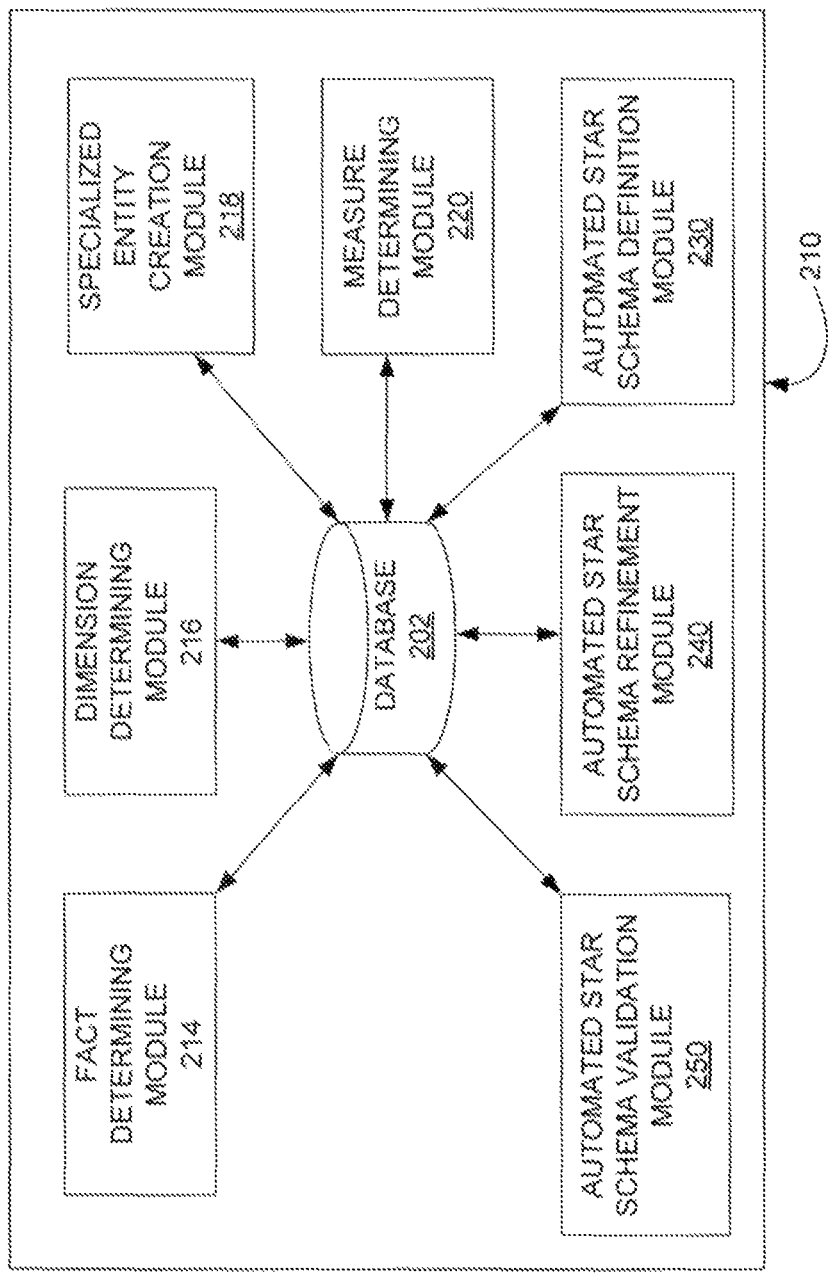
FIG. 2B illustrates an exploded view of the automated star schema generation module of FIG. 2A according to an embodiment herein.

FIG. 2B illustrates an exploded view of the automated star schema generation module 210 of FIG. 2A according to an embodiment herein. The automated star schema generation module 210 includes a fact determining module 214, a dimension determining module 216, a specialized entity creation module 218, a measure determining module 220, an automated star schema definition module 230, an automated star schema refinement module 240, and an automated star schema validation module 250. The fact determining module 214 is configured to automatically determine facts by analyzing frequently updated numeric columns from the columns. In one embodiment, the fact determining module 214 automatically groups together related facts within one source entity or within a set of related entities that are updated together. The dimension determining module 216 is configured to automatically determine dimensions by analyzing non-numeric columns from the columns that are infrequently updated and that are linked to the facts by foreign keys. In one embodiment, the dimension determining module 216 automatically groups together related dimension attributes within one source entity or within a set of related entities that are updated together to create denormalized tables. In another embodiment, the dimension determining module 216 determines dimension hierarchies based on hierarchical relationships within entities identified as dimensions. The specialized entity creation module 218 is configured to create a specialized entity if an entity is related to currency or unit of measures. The automated star schema definition module 230 automatically groups the facts and the dimensions within (i) a source entity, or (ii) a set of related entities to determine a star schema for the source database 114.

The measure determining module 220 is configured to suggest workflow specific measures and workflow correlated attributes specific measures that includes (i) temporal measures based on temporal attributes and the workflow stage, (ii) progress tracking measures based on progress tracking attributes and the workflow stage, (iii) priority related measures based on priority related attributes and the workflow stage, or (iv) ownership related measures based on ownership related attributes and the workflow stage. In one embodiment, the measure determining module 220 automatically determines generalized measures as well as workflow specific measures based on frequently used expressions obtained from the input gathering module 203. The measure determining module 220 may suggest workflow specific measures (e.g., count of items in each stage, percentage of items in each stage, and active vs. closed items in each stage). In one embodiment, the measure determining module 220 discovers correlated temporal attributes for workflows and suggests additional measures (e.g., duration in each stage, min/max/average times for each stage, minimum/ maximum/average/mean time for workflow completion, active vs. closed items over time, number of times total time exceeds promised time, etc.). In another embodiment, the measure determining module 220 discovers correlated ownership attributes for workflow, and suggests additional measures tracking productivity (e.g., resolved by owner, resolved by owner over time, or measure indicators of problems like reassignment frequency, reassignment frequency over time). In yet another embodiment, the measure determining module 220 discovers correlated priority attributes for workflow and suggests additional measures (e.g., count/percentage of items in each priority class, count/percentage of items in each priority class by stage). In yet another embodiment, the measure determining module 220 discovers correlated progress tracking attributes and suggests additional measures that are indicators of progress (e.g., updates per stage, updates per stage over time, etc.) to determine a star schema for the source database 114.

In one embodiment, the input gathering module 203 automatically compares the source database 114 that is customized with baseline template warehouse to gather custom information selected from a group that includes one or more of i) a data type or a length of custom columns, ii) frequently used expressions on custom columns, iii) custom entities or information on constituent columns of the custom entities, iv) custom entity keys, v) relationships of custom entities with other entities, vi) relationships within custom entities, vii) a contribution of custom entities to specialized entities, viii) an update frequency of custom entities and columns, ix) grouping of custom entity and column updates, and x) a contribution of custom entities and columns to workflows and correlated attributes. The fact determining module 214 automatically determines facts by determining frequently updated numeric non key custom columns and the custom entities. The dimension determining module 216 automatically determines dimensions by determining non-numeric custom columns and the custom entities that are infrequently updated and that are linked to the facts by foreign keys. The automated star schema refinement module 240 automatically determines dimension hierarchies based on hierarchical relationships within custom entities determined to be dimensions. The automated star schema refinement module 240 automatically suggests one or more of (i) subsumption of a custom entity into an entity of the template warehouse star schema based on a type of mapped target of related entities, a column type of the custom entity or an update frequency of the custom entity if the custom entity is related to the entity of the template warehouse star schema, (ii) creation of new facts or dimensions for the custom entity based on a column type of the custom entity or an update frequency of the custom entity if the custom entity is a standalone entity, and (iii) creation of specialized entities or augmentation of specialized entities in the template warehouse star schema if the custom entity is related to a currency or a unit of measure.

The automated star schema refinement module 240 may automatically refine measures in the template warehouse with frequently used expressions on new custom columns. In one embodiment, the automated star schema refinement module 240 may refine measures by automatically flagging measures involving dropped or modified columns or entities for review. The automated star schema refinement module 240 may automatically incorporate new workflow specific measures into the template warehouse if the custom entities or the custom columns contribute to workflows or workflow correlated attributes.

In one embodiment, the input gathering module 203 may gather the custom information by querying programmatic APIs associated with the customized source database 114 to determine source customizations with reference to baseline template warehouse. The source customizations include one or more of (a) custom entities, and (b) custom columns. The custom entities include (i) new entities that are added to the template warehouse star schema, and (ii) dropped entities of the template warehouse star schema, and the custom columns includes (i) new columns that are added to the entities of the template warehouse star schema, and (ii) modified or dropped columns of the template warehouse star schema. The input gathering module 203 may gather the custom information by automatically analyzing queries on the custom source database 114 to determine one or more of (i) custom entities and custom columns, (ii) custom entity keys, (iii) relationships between and within custom entities, (iv) potential measures for the custom columns, (v) workflow attributes based on the custom columns, and (vi) an update frequency associated with the custom entities and the custom columns of the custom source database 114. The input gathering module 203 may gather the custom information by automatically analyzing the source data to determine one or more of (i) custom entities and custom columns, (ii) if the custom columns are entity keys, (iii) if the custom columns contribute to relationships between and within entities, (iv) if the custom columns contribute to workflows, and (v) if the custom columns contribute to specialized entities. The operational reporting environment analysis module 205 may determine a relevance of custom entities by analyzing an underlying model queries on the custom entities in operational reports to determine (i) relevant custom entities, (ii) relevant custom columns, (iii) relationships between and within the custom entities, and (iv) measures on the custom columns. The measure determining module 220 is configured to suggest workflow specific measures and workflow correlated attributes specific measures that includes (i) temporal measures based on custom temporal attributes and the workflow stage, (ii) progress tracking measures based on custom progress tracking attributes and the workflow stage, (iii) priority related measures based on custom priority related attributes and the workflow stage, or (iv) ownership related measures based on custom ownership related attributes and the workflow stage.

The automated star schema validation module 250 is configured to automatically validate one or more of i) a data type or a length of existing columns, ii) existing entities, iii) existing entity keys, iv) relationships of existing entities with other entities, v) relationships within existing entities, vi) a contribution of existing entities to specialized entities, or vii) a contribution of existing entities and columns to workflow and correlated attributes in the data warehouse based on one or more of (i) a usage analysis technique by automatically querying on the source database 114 to determine if existing warehouse entities, columns and workflow attributes are being used and if assumed relationships are being exercised, (ii) a data profiling technique by automatically analyzing data in the source database to determine changes due to customer specific customizations, source schema updates, or data quality issues, (iii) an operational reporting environment analysis technique by automatically analyzing an underlying model and queries in operational reports to identify which of the existing entities, relationships, and measures are relevant and if specialized entities or standard units assumed are valid, and (iv) a source metadata analysis technique by automatically analyzing programmatic metadata APIs or documentation to identify changes due to customer specific customizations or source schema updates. The automated star schema validation module 250 may automatically validate facts by determining frequently updated numeric non key custom columns and the custom entities. The automated star schema validation module 250 may further automatically validate dimensions by determining non-numeric custom columns and the custom entities that are infrequently updated and that are linked to the facts by foreign keys. The automated star schema validation module 250 may further automatically validate dimension hierarchies based on hierarchical relationships within custom entities determined to be dimensions.

Figure 3A:
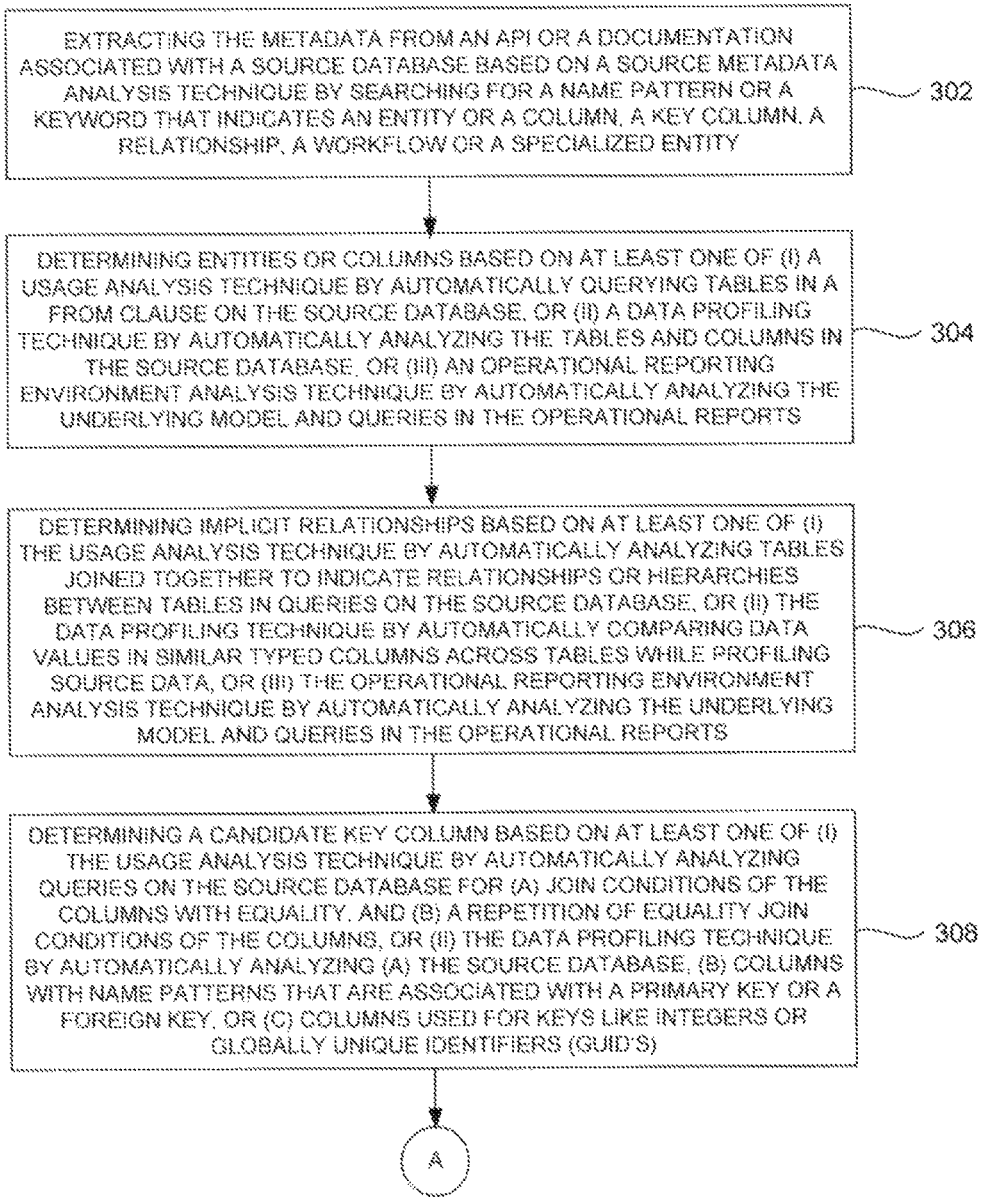
FIGS. 3A and 3B are flow diagrams illustrating a method of automatically gathering inputs for defining, refining or validating a star schema for the source database of FIG. 1 according to an embodiment herein.
Figure 3B:
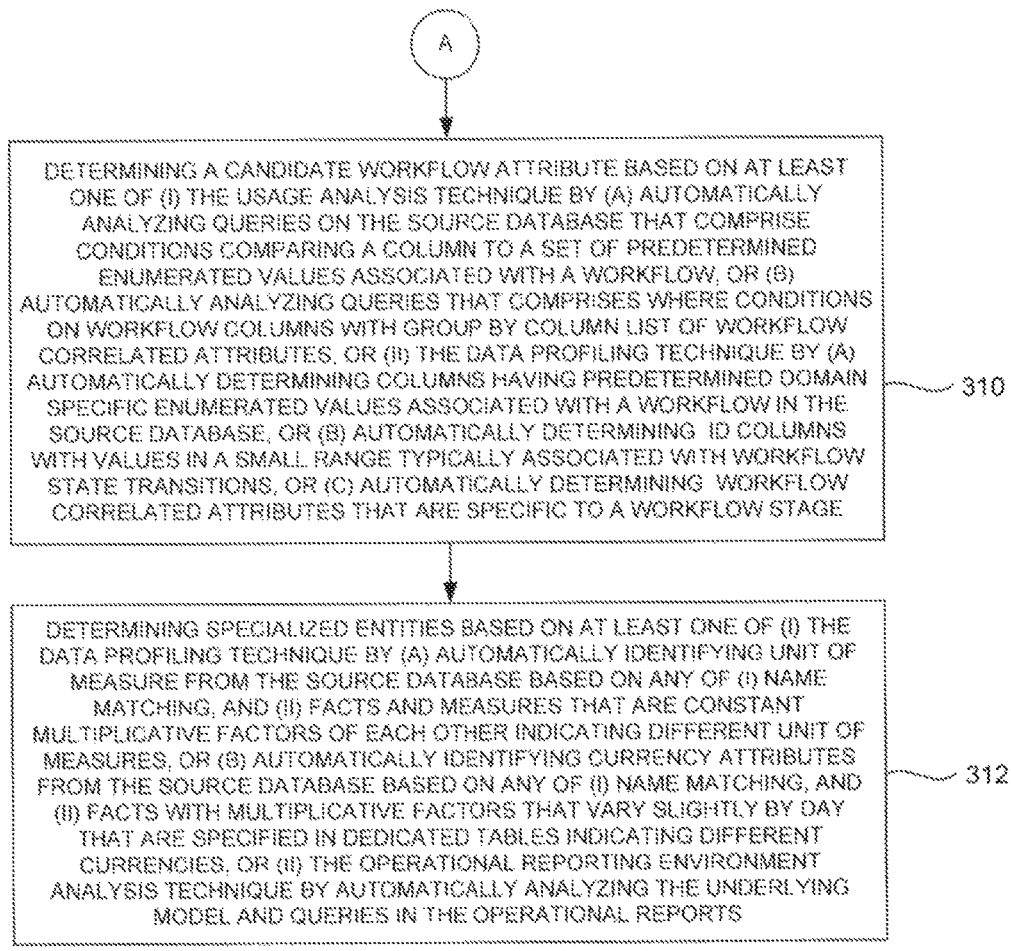

FIGS. 3A and 3B are flow diagrams illustrating a method for automatically gathering inputs for defining, refining or validating star schema for a source database 114 of FIG. 1 according to an embodiment herein. At step 302, the source metadata analysis module 204 extracts metadata from an API or documentation associated with the source database 114 based on a source metadata analysis technique by searching for a name pattern, and/or a keyword that indicates a key column, a relationship, a workflow or a specialized entity. At step 304, the input gathering module 203 determines entities or columns based on one or more of (i) a usage analysis technique by automatically querying tables in a 'from' clause on the source database 114, (ii) a data profiling technique by automatically analyzing the tables and columns in the source database 114, and (iii) an operational reporting environment analysis technique by automatically analyzing an underlying model and queries in the operational reports. At step 306, the input gathering module 203 determines implicit relationships based on one or more of (i) the usage analysis technique by automatically analyzing tables joined together to indicate relationships or hierarchies between tables in queries on the source database 114, (ii) the data profiling technique by automatically comparing data values in similar typed columns across tables while profiling source data, and (iii) the operational reporting environment analysis technique by automatically analyzing an underlying model and queries in the operational reports.

At step 308, the input gathering module 203 determines a candidate key column based on one or more of (i) the usage analysis technique by automatically analyzing queries on the source database 114 for (a) join conditions of the columns with equality, and (b) a repetition of equality join conditions of the columns, and (ii) the data profiling technique by automatically analyzing (a) the source database 114, (b) columns with name patterns that are associated with a primary key or a foreign key, and/or (c) columns used for keys like integers or globally unique identifiers (GUID's). At step 310, the input gathering module 203 determines a candidate workflow attribute based on the usage analysis technique by (a) automatically analyzing queries on the source database 114 that includes conditions comparing a column to a set of predetermined enumerated values associated with a workflow, or (b) automatically analyzing queries on the group by column list that includes where conditions on workflow columns. In one embodiment, the input gathering module 203 may determine a candidate workflow attribute based on the data profiling technique by (a) automatically determining columns having predetermined domain specific enumerated values associated with a workflow in the source database 114, or (b) automatically determining ID columns with values in a small range typically associated with workflow state transitions, or (c) automatically determining workflow correlated attributes that are specific to a workflow stage. At step 312, the input gathering module 203 determines specialized entities based on one or more of (i) the data profiling technique by (a) automatically identifying unit of measure from the source database 114 based on name matching, and/or facts and measures that are constant multiplicative factors of each other indicating different unit of measures, or (b) automatically identifying currency attributes from the source database 114 based on name matching, and/or facts with multiplicative factors that vary slightly by day that are specified in dedicated tables indicating different currencies, and (ii) the operational reporting environment analysis technique by automatically analyzing an underlying model and queries in the operational reports. In one embodiment, the input gathering module 203 determines commonly used measures based on one or more of (i) the usage analysis technique by automatically analyzing queries on the source database for expressions on numeric attributes in a projection list, and (ii) the operational reporting environment analysis technique by analyzing an underlying model and queries in the operational reports. In another embodiment, the input gathering module 203 is configured to determine, based on the usage analysis technique, an update frequency associated with the entities and the columns in the source database based on a number of inserts, updates, and/or deletes in the entities and a track of which of the columns are updated.

Figure 4A:
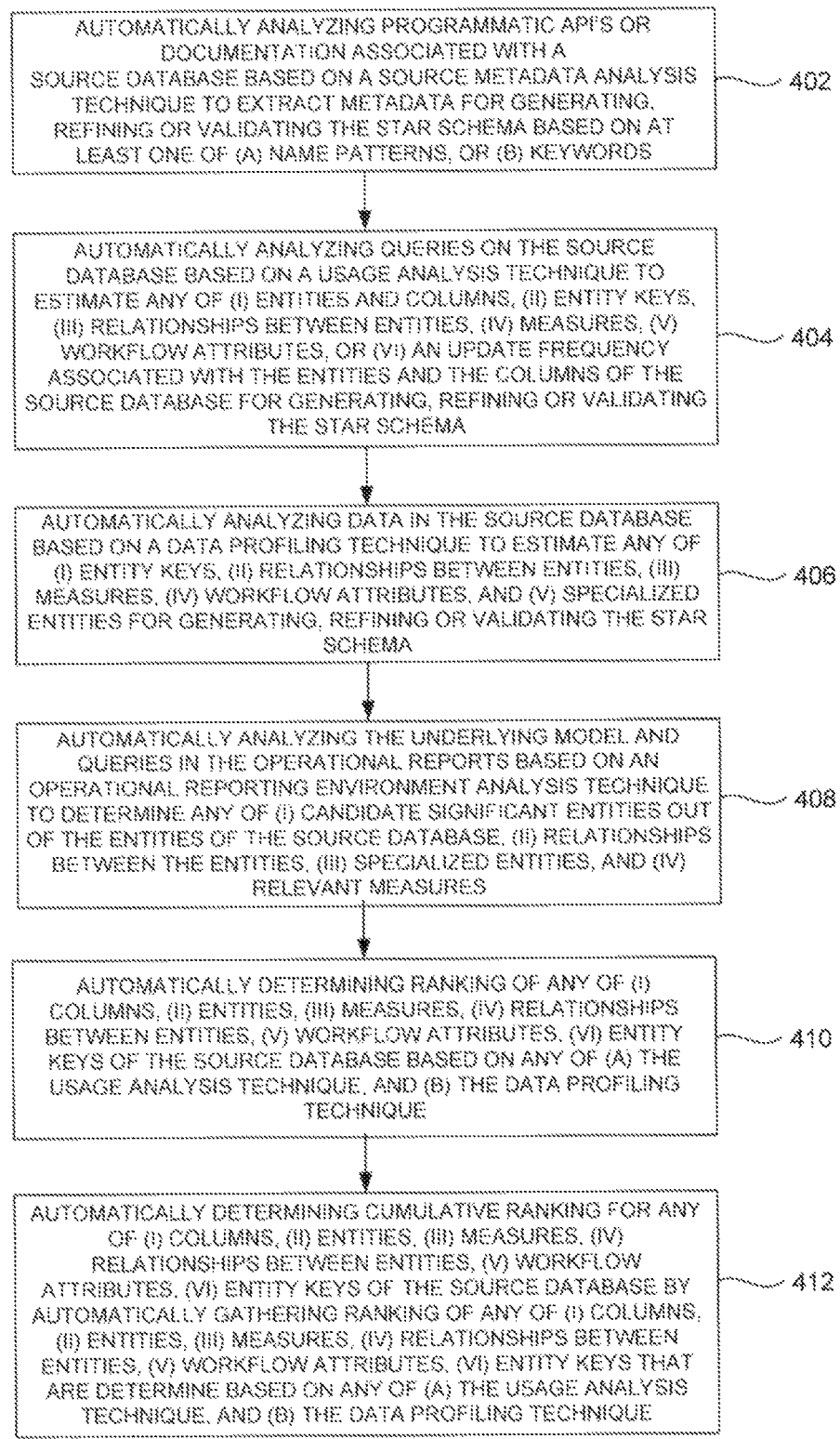
FIG. 4A is a flow diagram illustrating a method of automatically gathering inputs for defining, refining or validating star schema for the source database of FIG. 1 according to an embodiment herein.

FIG. 4A is a flow diagram illustrating a method for automatically gathering inputs for defining, refining or validating star schema for a source database 114 of FIG. 1 according to an embodiment herein. At step 402, the source metadata analysis module 204 automatically analyzes programmatic APIs or documentation associated with the source database 114 based on a source metadata analysis technique to extract metadata for defining, refining or validating the star schema based on name patterns, and/or keywords. In one embodiment, the metadata is selected from a group that includes (i) entities and columns, (ii) column types and lengths, (iii) entity keys, (iv) relationships between and within the entities, (v) workflow attributes, and/or (vi) specialized entities corresponding to the source database 114. At step 404, the usage analysis module 206 automatically analyzes queries on the source database 114 based on a usage analysis technique to identify one or more of (i) entities and columns, (ii) entity keys, (iii) relationships between and within entities, (iv) measures, (v) workflow attributes, (vi) an update frequency associated with the entities and the columns, and (vii) grouping updates of the entities and the columns of the source database 114 for defining, refining or validating the star schema. At step 406, the data profiling module 208 automatically analyzes data in the source database 114 based on a data profiling technique to identify one or more of (i) entity keys, (ii) relationships between and within entities, (iii) measures, (iv) workflow attributes, and (v) specialized entities for defining, refining or validating the star schema. At step 408, the operational reporting environment analysis module 205 automatically analyzes an underlying model and queries in the operational reports based on an operational reporting environment analysis technique to (i) provide suggestions on significant entities out of the entities of the source database 114, and/or (ii) identify relationships between and within the entities, the specialized entities, and commonly used measures. At step 408, the usage analysis module 206 automatically determines ranking of one or more of (i) columns, (ii) entities, (iii) measures, (iv) relationships between and within entities, (v) workflow attributes, (vi) entity keys of the source database based on a usage analysis technique. In one embodiment, the data profiling module 206 automatically determines ranking of one or more of (i) columns, (ii) entities, (iii) measures, (iv) relationships between and within entities, (v) workflow attributes, (vi) entity keys of the source database based on a data profiling technique. At step 410, the rank determining module 212 automatically determines cumulative ranking for one or more of (i) columns, (ii) entities, (iii) measures, (iv) relationships between and within entities, (v) workflow attributes, (vi) entity keys of the source database by automatically gathering ranking of any of (i) columns, (ii) entities, (iii) measures, (iv) relationships between and within entities, (v) workflow attributes, (vi) entity keys that are determine based on one or more of (a) the usage analysis technique, and (b) the data profiling technique.

Figure 4B:
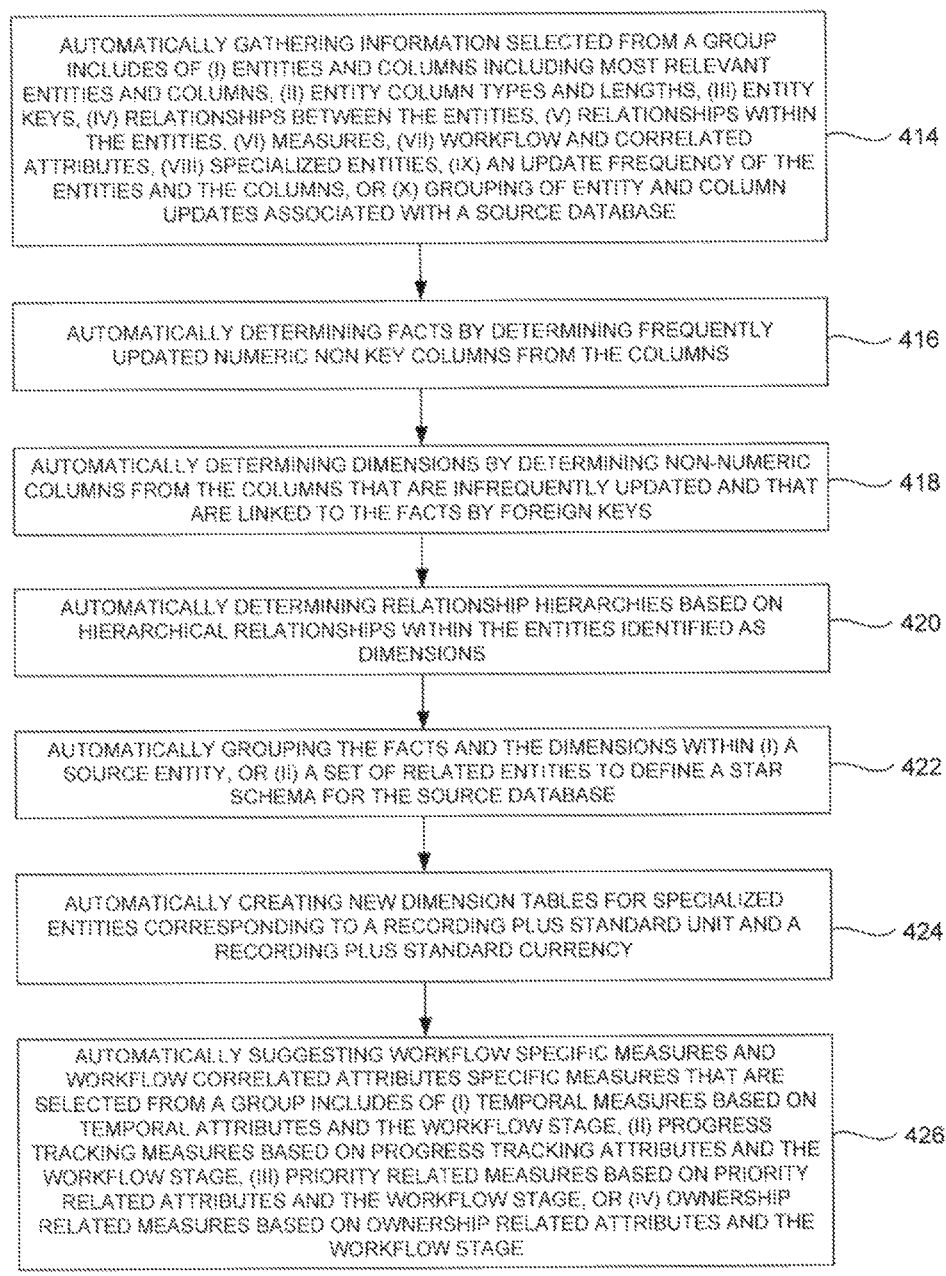
FIG. 4B is a flow diagram illustrating a method of automatically defining a star schema for the source database of FIG. 1 according to an embodiment herein.

FIG. 4B is a flow diagram illustrating a method of automatically defining a star schema for the source database 114 of FIG. 1 according to an embodiment herein. At step 414, the input gathering module 203 automatically gathers information associated with the source database 114. The information may include one or more of (i) entities and columns including most relevant entities and columns, (ii) entity column types and lengths, (iii) entity keys, (iv) relationships between the entities, (v) relationships within the entities, (vi) measures, (vii) workflow and correlated attributes, (viii) specialized entities, (ix) an update frequency of the entities and the columns, or (x) grouping of entity and column updates associated with the source database 114. At step 416, the fact determining module 214 automatically determines facts by determining frequently updated numeric non key columns from the columns. At step 418, the dimension determining module 216 automatically determines dimensions by determining non-numeric columns from the columns that are infrequently updated and that are linked to the facts by foreign keys. At step 420, the automated star schema definition module 230 automatically determines dimension hierarchies based on hierarchical relationships within entities identified as dimensions. At step 422, the automated star schema definition module 230 automatically groups the facts and the dimensions within (i) a source entity, or (ii) a set of related entities to determine a star schema for the source database 114. At step 424, the specialized entity creation module 218 automatically creates new dimension tables for specialized entities corresponding to a recording plus standard unit and a recording plus standard currency. In one embodiment, a fact table references the recording plus standard unit as well as the recording plus standard currency. At step 426, the measure determining module 220 automatically suggests workflow specific measures and workflow correlated attributes specific measures that are selected from a group includes of (i) temporal measures based on temporal attributes and the workflow stage, (ii) progress tracking measures based on progress tracking attributes and the workflow stage, (iii) priority related measures based on priority related attributes and the workflow stage, or (iv) ownership related measures based on ownership related attributes and the workflow stage.

In one embodiment, the method further includes the following steps: (i) automatically grouping together related facts within one source entity or within a set of related entities that are updated together, and (ii) automatically grouping together related dimension attributes within one source entity or within a set of related entities that are updated together to create denormalized tables.

Figure 5A:
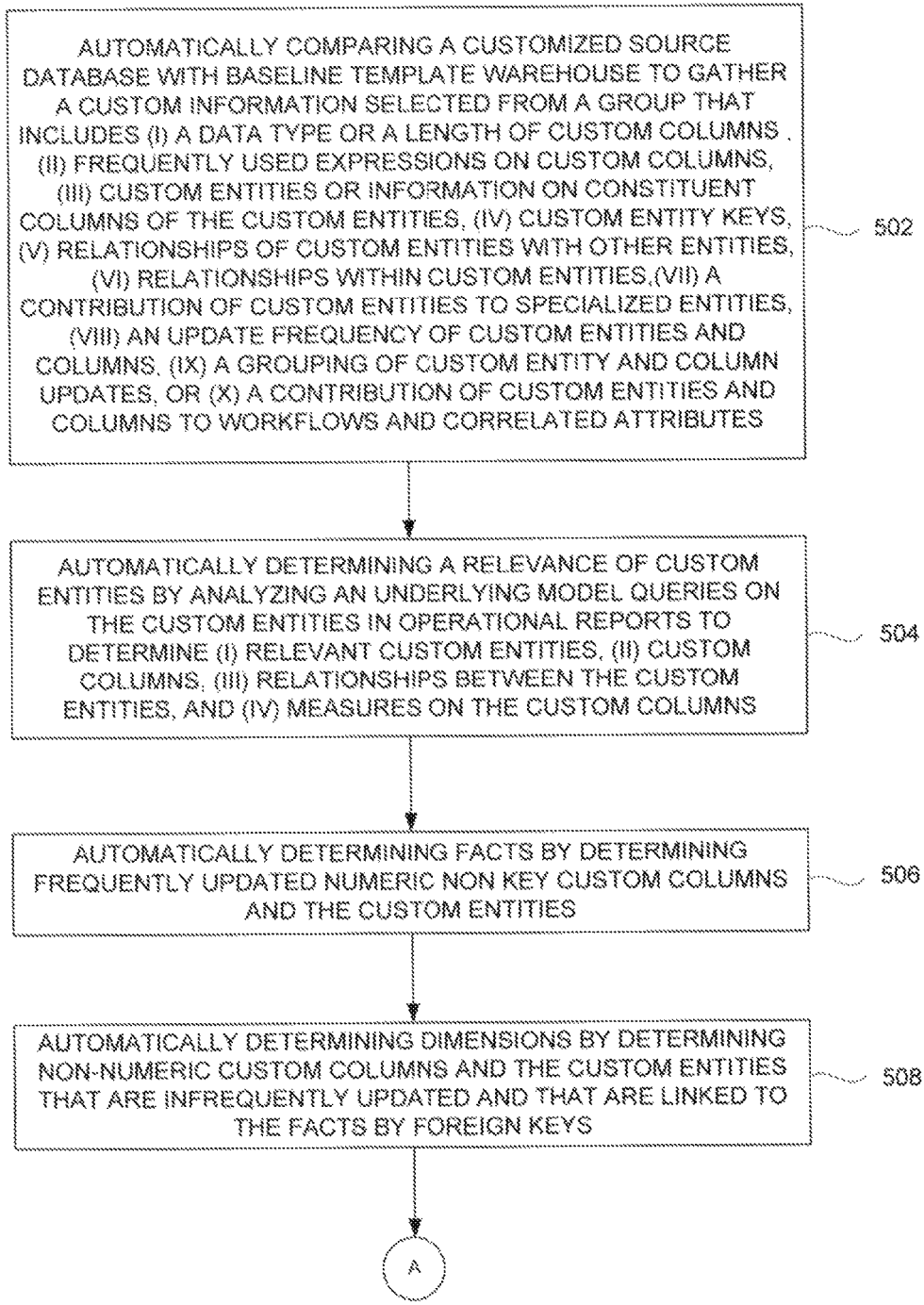
FIGS. 5A to 5C are flow diagrams illustrating a method for automatically refining a template warehouse star schema according to an embodiment herein.
Figure 5B:
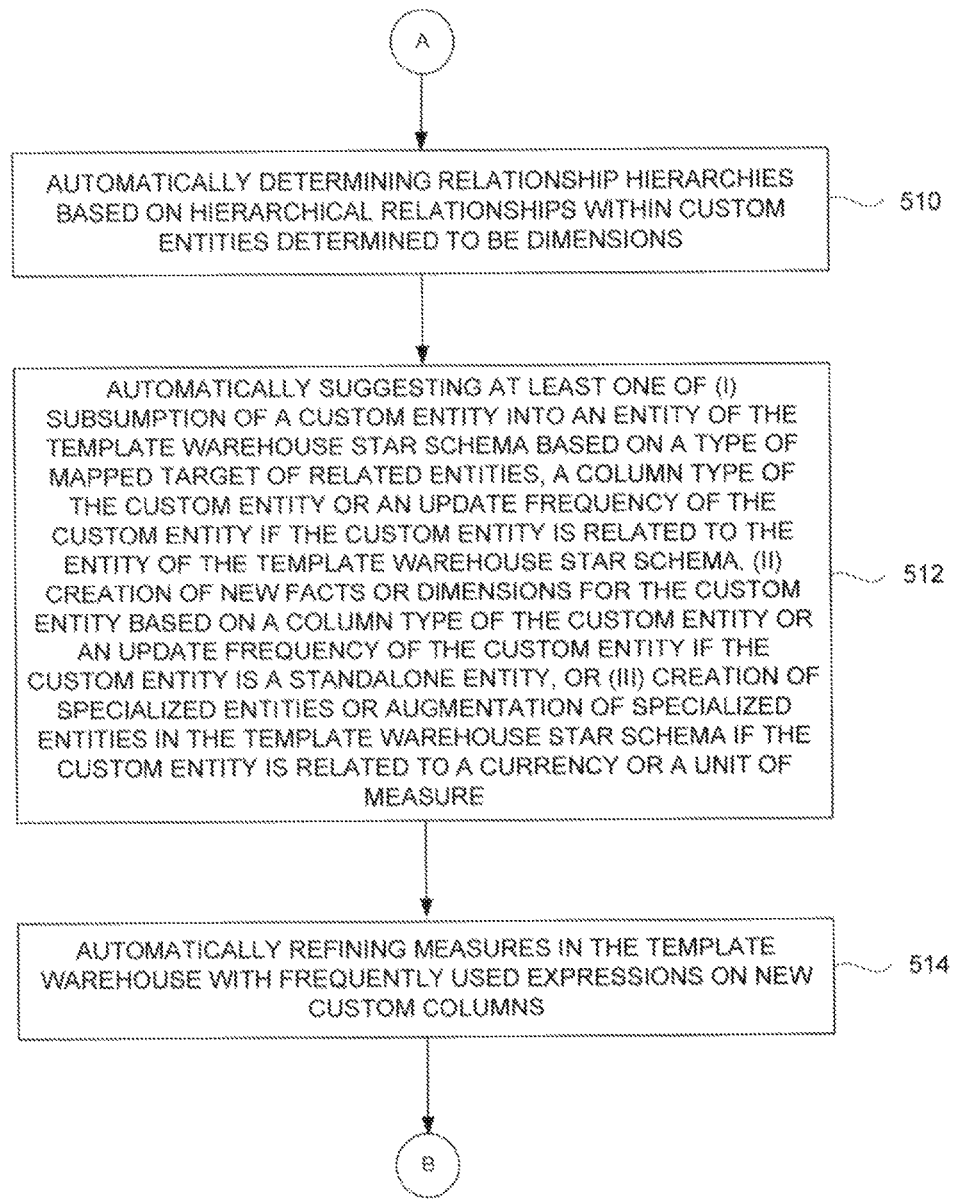
Figure 5C:
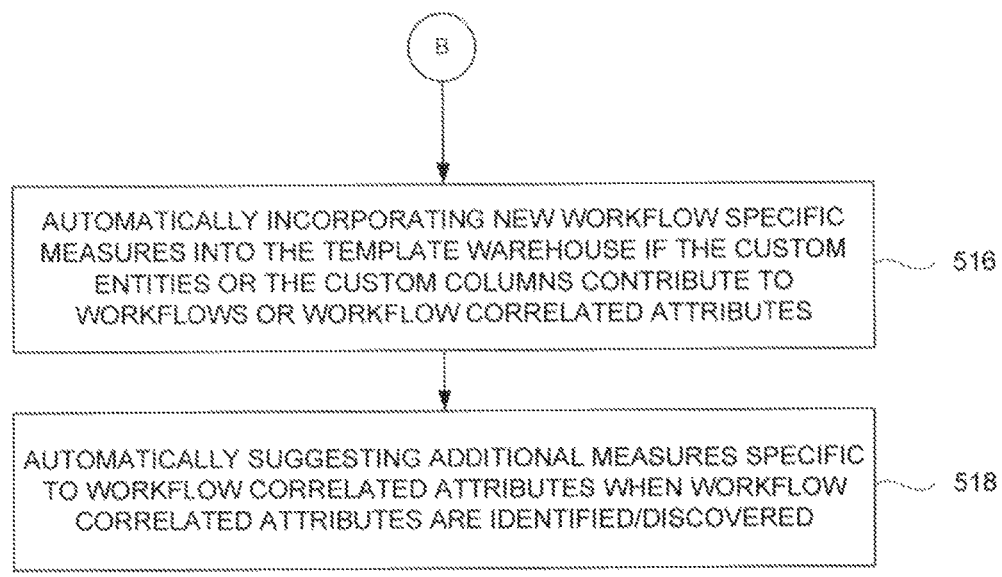

FIGS. 5A to 5C are flow diagrams illustrating a method for automatically refining a template warehouse star schema according to an embodiment herein. At step 502, the input gathering module 203 automatically compares a customized source database 114 with baseline template warehouse to gather custom information. The custom information may include i) a data type or a length of custom columns, ii) frequently used expressions on custom columns, iii) custom entities or information on constituent columns of the custom entities, iv) custom entity keys, v) relationships of custom entities with other entities, vi) relationships within custom entities, vii) a contribution of custom entities to specialized entities, viii) an update frequency of custom entities and columns, ix) a grouping of custom entity and column updates, and/or x) a contribution of custom entities and columns to workflows and correlated attributes. At step 504, the operational reporting environment analysis module 205 automatically determines a relevance of custom entities by analyzing an underlying model queries on the custom entities in operational reports to determine (i) relevant custom entities, (ii) relevant custom columns, (iii) relationships between and within the custom entities, and/or (iv) measures on the custom columns. At step 506, the fact determining module 214 automatically determines facts by determining frequently updated numeric non key custom columns and the custom entities. At step 508, the dimension determining module 216 automatically determines dimensions by determining non-numeric custom columns and the custom entities that are infrequently updated and that are linked to the facts by foreign keys. At step 510, the automated star schema refinement module 240 automatically determines dimension hierarchies based on hierarchical relationships within custom entities determined to be dimensions.

At step 512, the automated star schema refinement module 240 automatically suggests one or more of (i) subsumption of a custom entity into an entity of the template warehouse star schema based on a type of mapped target of related entities, a column type of the custom entity or an update frequency of the custom entity if the custom entity is related to the entity of the template warehouse star schema, (ii) creation of new facts or dimensions for the custom entity based on a column type of the custom entity or an update frequency of the custom entity if the custom entity is a standalone entity, and (iii) creation of specialized entities or augmentation of specialized entities in the template warehouse star schema if the custom entity is related to a currency or a unit of measure.

At step 514, the automated star schema refinement module 240 automatically refines measures in the template warehouse with frequently used expressions on new custom columns. The automated star schema refinement module 240 may refine measures by automatically flagging measures involving dropped or modified columns or entities for review. At step 516, the automated star schema refinement module 240 automatically incorporates new workflow specific measures into the template warehouse if the custom entities or the custom columns contribute to workflows or workflow correlated attributes. The workflow specific measures include one or more of (a) count of items in each stage, (b) percentage of items in each stage, (c) active vs. closed items in each stage, and (d) number/percentage of reopened items. At step 518, the automated star schema refinement module 240 automatically suggests additional measures specific to workflow correlated attributes when workflow correlated attributes are identified/discovered. The additional workflow correlated attributes specific measures include (i) temporal measures that are suggested based on custom temporal attributes and the workflow stage, (ii) progress tracking measures that are suggested based on custom progress tracking attributes and the workflow stage, (iii) priority related measures that are suggested based on custom priority related attributes and the workflow stage, and/or (iv) ownership related measures that are suggested based on custom ownership related attributes and the workflow stage.

In one embodiment, the method further includes the following step of gathering the custom information by automatically querying programmatic APIs associated with a customized source database 114 to determine source customizations with reference to baseline template warehouse. The source customizations may include one or more of (a) custom entities, and (b) custom columns. The custom entities may include (a) new entities that are added to the template warehouse star schema, and (b) modified entities of the template warehouse star schema. The custom columns may include (a) new columns that are added to the entities of the template warehouse star schema, and (b) modified or dropped columns of the template warehouse star schema.

In another embodiment, the method further includes the following step: (i) gathering the custom information by automatically analyzing queries on the custom source database 114 to determine one or more of (a) custom entities and custom columns, (b) custom entity keys, (c) relationships between and within custom entities, (d) potential measures for the custom columns, (e) workflow attributes based on the custom columns, and (f) an update frequency associated with the custom entities and the custom columns of the custom source database 114; and (ii) gathering the custom information by automatically analyzing the source database 114 to determine one or more of (a) custom entities and custom columns, (b) if the custom columns are entity keys, (c) if the custom columns contribute to relationships between and within entities, (d) if the custom columns contribute to workflows, and (e) if the custom columns contribute to specialized entities.

Figure 6:
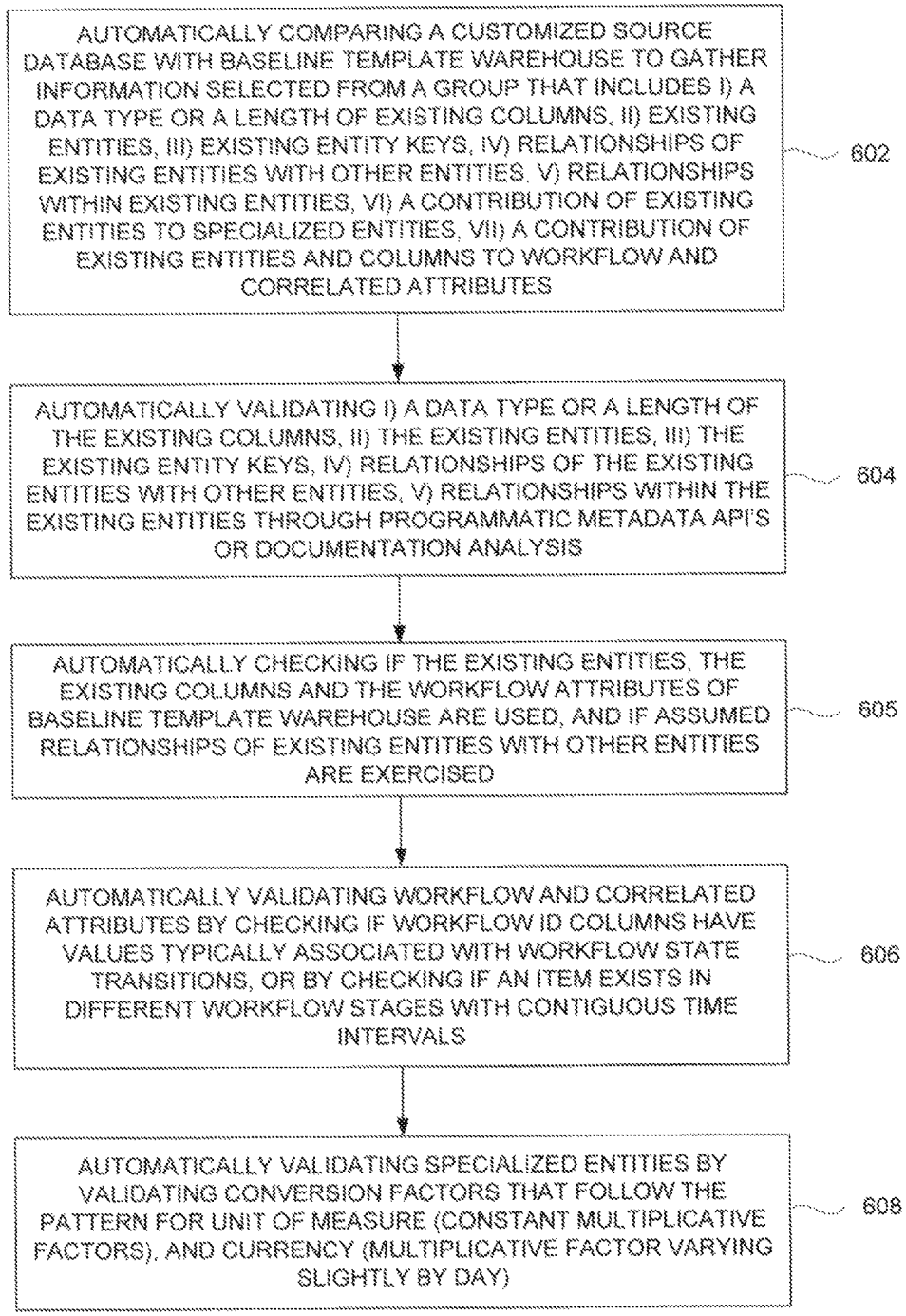
FIG. 6 is a flow diagram illustrating a method for automatically validating a template warehouse star schema according to an embodiment herein.

FIG. 6 is a flow diagram illustrating a method for automatically validating a template warehouse star schema according to an embodiment herein. At step 602, the input gathering module 203 automatically compares a customized source database 114 with baseline template warehouse to gather information such as (i) a data type or a length of existing columns, ii) existing entities, iii) existing entity keys, iv) relationships of existing entities with other entities, v) relationships within existing entities, vi) a contribution of existing entities to specialized entities, and/or vii) a contribution of existing entities and columns to workflow and correlated attributes. At step 604, the automated star schema validation module 250 automatically validates i) a data type or a length of the existing columns, ii) the existing entities, iii) the existing entity keys, iv) relationships of the existing entities with other entities, and/or v) relationships within the existing entities through programmatic metadata API'S or documentation analysis. At step 605, the automated star schema validation module 250 automatically checks if the existing entities, the existing columns and the workflow attributes of baseline template warehouse are used, and if assumed relationships of existing entities with other entities are exercised. At step 606, the automated star schema validation module 250 automatically validates workflow and correlated attributes by checking if workflow ID columns have values typically associated with workflow state transitions, or by checking if an item exists in different workflow stages with contiguous time intervals. At step 608, the automated star schema validation module 250 automatically validates specialized entities by validating conversion factors that follow the pattern for Unit of Measure (constant multiplicative factors), and Currency (multiplicative factor varying slightly by day).

Figure 7:
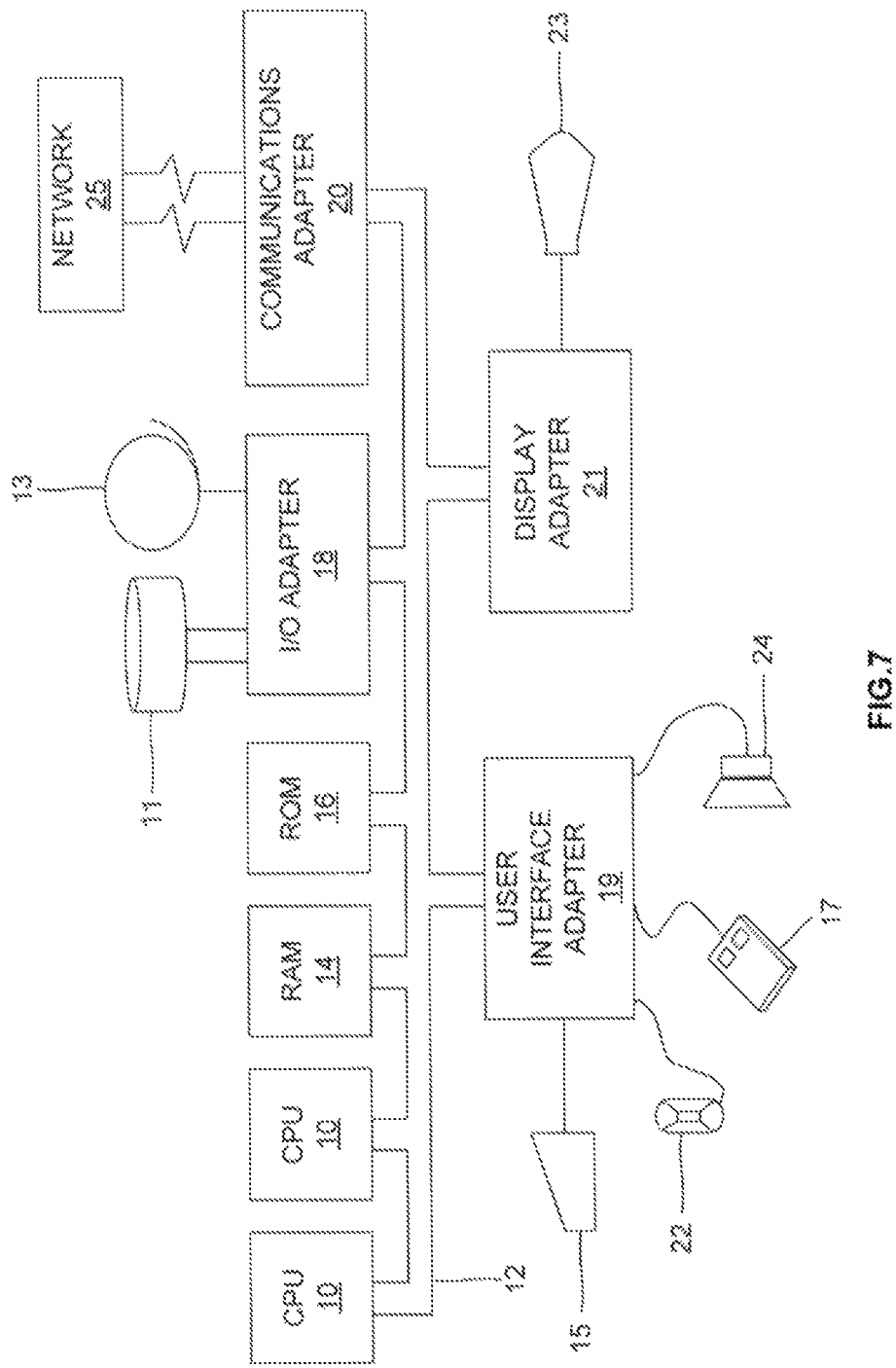
FIG. 7 is a computer system used in accordance with the embodiments herein.

FIG. 7, with reference to FIGS. 1 through 6, is the computer system 104 of FIG. 1 used in accordance with the embodiments herein. The computer system 104 includes one or more of a personal computer, a laptop, a tablet device, a smartphone, a mobile communication device, a personal digital assistant, or any other such computing device, in one example embodiment, in another example embodiment. This schematic drawing illustrates a hardware configuration of an information handling/computer system in accordance with the embodiments herein. The system includes one or more processor (e.g., the processor 104A) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The data warehouse star schema system 106 automatically provides suggestions for generating, refining or validating a star schema for the source database 114 based on an analysis of the source database 114. The data warehouse star schema system 106 defines or refines an existing warehouse schema in an automated fashion to handle customer specific customizations at the source database 114. The data warehouse star schema system 106 may be used to efficiently identify changes in the source warehouse schema.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An automated data warehouse star schema system that automatically refines a template warehouse star schema for a source database, the automated data warehouse schema system comprising:

a non-transitory storage device having embodied therein one or more routines operable to automatically refine the template warehouse star schema for the source database; and one or more processors coupled to the non-transitory storage device and operable to execute the one or more routines, wherein the one or more routines include:

an input gathering module, which when executed by the one or more processors, automatically compares a customized source database with a baseline template warehouse to gather a custom information comprising i) a data type or a length of custom columns, ii) frequently used expressions on custom columns, iii) custom entities or information on constituent columns of the custom entities, iv) custom entity keys, v) relationships of custom entities with other entities, vi) relationships within custom entities, vii) a contribution of custom entities to specialized entities, viii) an update frequency of custom entities and columns, ix) a grouping of custom entity and column updates, and x) a contribution of custom entities and columns to workflows and correlated attributes, wherein the custom information is gathered based on a combination of a usage analysis technique by automatically analyzing queries on the custom source database, a data profiling technique by automatically analyzing data in the custom source database and an operational reporting environment analysis technique by automatically analyzing an underlying model and queries in operational reports;

a fact determining module, which when executed by the one or more processors, automatically determines facts by determining frequently updated numeric non key custom columns and the custom entities;

a dimension determining module, which when executed by the one or more processors, automatically determines dimensions by determining non-numeric custom columns and the custom entities that are infrequently updated and that are linked to the facts by foreign keys; and an automated star schema refinement module, which when executed by the one or more processors, automatically suggests at least one of (i) subsumption of a custom entity into an entity of the template warehouse star schema based on a type of mapped target of related entities, a column type of the custom entity or an update frequency of the custom entity if the custom entity is related to the entity of the template warehouse star schema, (ii) creation of new facts or dimensions for the custom entity based on a column type of the custom entity or an update frequency of the custom entity if the custom entity is a standalone entity, or (iii) creation of specialized entities or augmentation of specialized entities in the template warehouse star schema if the custom entity is related to a currency or a unit of measure to refine a template warehouse star schema for the source database.

2. The automated data warehouse star schema system of claim 1, wherein the automated star schema refinement module automatically determines dimension hierarchies based on hierarchical relationships within custom entities determined to be dimensions.

3. The automated data warehouse star schema system of claim 1, wherein the automated star schema refinement module automatically refines measures in the template warehouse with frequently used expressions on new custom columns, wherein the refining comprises automatically flagging measures involving dropped or modified columns or entities for review.

4. The automated data warehouse star schema system of claim 1, further comprising a measure determining module, which when executed by the one or more processors, (a) automatically incorporates new workflow specific measures into the template warehouse if the custom entities or the custom columns contribute to workflows or workflow correlated attributes, or (b) automatically suggests workflow specific measures and workflow correlated attributes specific measures that are selected from a group comprising (i) temporal measures based on custom temporal attributes and the workflow stage, (ii) progress tracking measures based on custom progress tracking attributes and the workflow stage, (iii) priority related measures based on custom priority related attributes and the workflow stage, or (iv) ownership related measures based on custom ownership related attributes and the workflow stage.

5. The automated data warehouse star schema system of claim 1, wherein the custom information is gathered by querying programmatic APIs associated with the customized source database to determine source customizations with reference to the baseline template warehouse wherein the source customizations comprise any of (a) custom entities, or (b) custom columns, wherein the custom entities comprise any of (i) new entities that are added to the template warehouse star schema, or (ii) modified entities of the template warehouse star schema, and wherein the custom columns comprise any of (i) new columns that are added to the entities of the template warehouse star schema, or (ii) modified columns of the template warehouse star schema.

6. The automated data warehouse star schema system of claim 1, wherein queries on the custom source database are analyzed automatically to determine any of (i) custom entities and custom columns, (ii) custom entity keys, (iii) relationships between and within custom entities, (iv) potential measures for the custom columns, (v) workflow attributes based on the custom columns, or (vi) an update frequency associated with the custom entities and the custom columns of the custom source database.

7. The automated data warehouse star schema system of claim 1, wherein data in the custom source database is analyzed automatically to determine any of (i) custom entities and custom columns, (ii) if the custom columns are entity keys (iii) if the custom columns contribute to relationships between and within entities, (iv) if the custom columns contribute to workflows, or (v) if the custom columns or custom entities contribute to specialized entities.

8. The automated data warehouse star schema system of claim 4, wherein the temporal measures are selected from a group comprising (a) a duration in each workflow stage, (b) minimum, maximum, or average times for each workflow stage, (c) a minimum, maximum, or average time for workflow completion, (d) active or closed items over time, or (e) a number of times a total time exceeds a promised time.

9. The automated data warehouse star schema system of claim 4, wherein the progress tracking measures are selected from a group comprising (a) updates per workflow stage, or (b) updates per workflow stage over time.

10. The automated data warehouse star schema system of claim 4, wherein the ownership related measures are selected from a group comprising (a) measures related to tracking productivity selected from (i) resolved by an owner, or (ii) resolved by the owner over time, or (b) measures that indicates problems selected from (i) reassignment frequency, or (ii) a reassignment frequency over time.

11. The automated data warehouse star schema system of claim 4, wherein the priority related measures are selected from a group comprising (a) count or percentage of items in each priority class, or (b) count or percentage of items in each priority class by workflow stage.

12. One or more non-transitory computer readable storage mediums storing one or more sequences of instructions, which when executed by one or more processors, causes automatic refinement of a template warehouse star schema, by performing the steps of:

automatically comparing a customized source database with a baseline template warehouse to gather a custom information selected from i) a data type or a length of custom columns, ii) frequently used expressions on custom columns, iii) custom entities or information on constituent columns of the custom entities, iv) custom entity keys, v) relationships of custom entities with other entities, vi) relationships within custom entities, vii) a contribution of custom entities to specialized entities, viii) an update frequency of custom entities and columns, ix) a grouping of custom entity and column updates, and x) a contribution of custom entities and columns to workflows and correlated attributes, wherein the custom information is gathered based on a combination of a usage analysis technique by automatically analyzing queries on the custom source database, a data profiling technique by automatically analyzing data in the custom source database and an operational reporting environment analysis technique by automatically analyzing an underlying model and queries in operational reports;

automatically determining facts by determining frequently updated numeric non key custom columns and the custom entities;

automatically determining dimensions by determining non-numeric custom columns and the custom entities that are infrequently updated and that are linked to the facts by foreign keys;

automatically determining dimension hierarchies based on hierarchical relationships within custom entities determined to be dimensions; and automatically suggesting at least one of (i) subsumption of a custom entity into an entity of the template warehouse star schema based on a type of mapped target of related entities, a column type of the custom entity or an update frequency of the custom entity if the custom entity is related to the entity of the template warehouse star schema, (ii) creation of new facts or dimensions for the custom entity based on a column type of the custom entity or an update frequency of the custom entity if the custom entity is a standalone entity, or (iii) creation of specialized entities or augmentation of specialized entities in the template warehouse star schema if the custom entity is related to a currency or a unit of measure.

13. The one or more non-transitory computer readable storage mediums storing one or more sequences of instructions of claim 12, which when executed by the one or more processors further causes automatic refinement of measures in the template warehouse with frequently used expressions on new custom columns, wherein the refining comprises automatically flagging measures involving dropped or modified columns or entities for review.

14. The one or more non-transitory computer readable storage mediums storing one or more sequences of instructions of claim 12, which when executed by the one or more processors further causes (a) automatic incorporation of new workflow specific measures into the template warehouse if the custom entities or the custom columns contribute to workflows or workflow correlated attributes, or (b) automatic suggestion of workflow specific measures and workflow correlated attributes specific measures that are selected from a group comprising (i) temporal measures based on custom temporal attributes and the workflow stage, (ii) progress tracking measures based on custom progress tracking attributes and the workflow stage, (iii) priority related measures based on custom priority related attributes and the workflow stage, or (iv) ownership related measures based on custom ownership related attributes and the workflow stage.

15. The one or more non-transitory computer readable storage mediums storing one or more sequences of instructions of claim 12, wherein the custom information is gathered by querying programmatic APIs associated with the customized source database to determine source customizations with reference to the baseline template warehouse wherein the source customizations comprise any of (a) custom entities, or (b) custom columns, wherein the custom entities comprise any of (i) new entities that are added to the template warehouse star schema, or (ii) modified entities of the template warehouse star schema, and wherein the custom columns comprise any of (i) new columns that are added to the entities of the template warehouse star schema, or (ii) modified columns of the template warehouse star schema.

16. The one or more non-transitory computer readable storage mediums storing one or more sequences of instructions of claim 12, wherein queries on the custom source database are analyzed automatically to determine any of (i) custom entities and custom columns, (ii) custom entity keys, (iii) relationships between and within custom entities, (iv) potential measures for the custom columns, (v) workflow attributes of the custom columns, or (vi) an update frequency associated with the custom entities and the custom columns of the custom source database.

17. The one or more non-transitory computer readable storage mediums storing one or more sequences of instructions of claim 12, wherein data in the custom source database is analyzed automatically to determine any of (i) custom entities and custom columns, (ii) if the custom columns are entity keys (iii) if the custom columns contribute to relationships between and within entities, (iv) if the custom columns contribute to workflows, or (v) if the custom columns or custom entities contribute to specialized entities.

18. The one or more non-transitory computer readable storage mediums storing one or more sequences of instructions of claim 12, which when executed by the one or more processors further causes automatic determination of a relevance of custom entities by analyzing an underlying model and queries on the custom entities in operational reports to determine any of (i) relevant custom entities, (ii) relevant custom columns, (iii) relationships between and within the custom entities, or (iv) measures on the custom columns.

19. The one or more non-transitory computer readable storage mediums storing one or more sequences of instructions of claim 14, wherein the temporal measures are selected from a group comprising (a) a duration in each workflow stage, (b) minimum, maximum, or average times for each workflow stage, (c) a minimum, maximum, or average time for workflow completion, (d) active or closed items over time, or (e) a number of times a total time exceeds a promised time, wherein the progress tracking measures are selected from a group comprising (a) updates per workflow stage, or (b) updates per workflow stage over time, wherein the ownership related measures are selected from a group comprising (a) measures related to tracking productivity selected from (i) resolved by an owner, or (ii) resolved by the owner over time, or (b) measures that indicates problems selected from (i) reassignment frequency, or (ii) a reassignment frequency over time, and wherein the priority related measures are selected from a group comprising (a) count or percentage of items in each priority class, or (b) count or percentage of items in each priority class by workflow stage.

20. One or more non-transitory computer readable storage mediums storing one or more sequences of instructions, which when executed by one or more processors, causes automatic validation of a data warehouse, by performing the steps of:

automatically validating i) a data type or a length of existing columns, ii) existing entities, iii) existing entity keys, iv) relationships of existing entities with other entities, v) relationships within existing entities, vi) a contribution of existing entities to specialized entities, and vii) a contribution of existing entities and columns to workflow and correlated attributes in the data warehouse based on a combination of:

(i) a usage analysis technique by automatically querying on a source database to determine if existing warehouse entities, columns and workflow attributes are being used and if assumed relationships are being exercised, (ii) a data profiling technique by automatically analyzing data in the source database to determine changes due to customer specific customizations, source schema updates, or data quality issues, and (iii) an operational reporting environment analysis technique by automatically analyzing an underlying model and queries in operational reports to identify which of the existing entities, relationships, and measures are relevant and if specialized entities or standard units assumed are valid;

automatically validating facts by determining frequently updated numeric non key custom columns and the custom entities;

automatically validating dimensions by determining non-numeric custom columns and the custom entities that are infrequently updated and that are linked to the facts by foreign keys; and automatically validating dimension hierarchies based on hierarchical relationships within custom entities determined to be dimensions.

* * * * *